United States Patent
Cash et al.

(10) Patent No.: US 8,019,828 B2
(45) Date of Patent: Sep. 13, 2011

(54) SYSTEM AND METHOD FOR DEFINING ATTRIBUTES, DECISION RULES, OR BOTH, FOR REMOTE EXECUTION, CLAIM SET III

(75) Inventors: Joseph Larry Cash, Marietta, GA (US); Edith D. Ryan, Manasquan, NJ (US); Ray F. Bridenbaugh, Jr., Marietta, GA (US)

(73) Assignee: CRIF Corporation, Tampa, FL (US)

( * ) Notice: Subject to any disclaimer, the term of this patent is extended or adjusted under 35 U.S.C. 154(b) by 1380 days.

(21) Appl. No.: 11/279,074

(22) Filed: Apr. 7, 2006

(65) Prior Publication Data

US 2006/0293932 A1 Dec. 28, 2006

Related U.S. Application Data

(60) Provisional application No. 60/684,309, filed on May 24, 2005.

(51) Int. Cl.
  *G06F 15/16* (2006.01)
(52) U.S. Cl. ........... 709/217; 709/223; 707/944; 705/30
(58) Field of Classification Search .................. 235/375, 235/376, 379, 380, 382; 707/783, 784, 944, 707/950, 999.102; 709/203, 217, 223; 705/30, 705/34, 35, 38
  See application file for complete search history.

(56) References Cited

U.S. PATENT DOCUMENTS

| | | | |
|---|---|---|---|
| 5,285,308 A | | 2/1994 | Jenkins et al. |
| 5,710,884 A | * | 1/1998 | Dedrick .................. 709/217 |
| 6,073,104 A | | 6/2000 | Field |
| 6,327,574 B1 | | 12/2001 | Kramer et al. |
| 6,389,407 B1 | | 5/2002 | Paradis et al. |
| 6,405,173 B1 | | 6/2002 | Honarvar et al. |
| 6,529,948 B1 | | 3/2003 | Bowman-Amuah |
| 6,598,034 B1 | * | 7/2003 | Kloth .............................. 706/47 |
| 6,601,234 B1 | | 7/2003 | Bowman-Amuah |
| 6,708,166 B1 | | 3/2004 | Dysart et al. |
| 6,901,406 B2 | * | 5/2005 | Nabe et al. ..................... 707/694 |
| 6,965,887 B2 | * | 11/2005 | Huelsman et al. ............. 706/47 |
| 6,981,028 B1 | * | 12/2005 | Rawat et al. .................. 709/217 |
| 6,988,085 B2 | * | 1/2006 | Hedy .............................. 705/51 |
| 7,006,979 B1 | | 2/2006 | Samra et al. |
| 7,047,211 B1 | * | 5/2006 | Van Etten et al. ............... 705/26 |
| 7,103,570 B1 | * | 9/2006 | Morea et al. .................... 705/38 |
| 7,133,935 B2 | * | 11/2006 | Hedy ........................... 709/250 |

(Continued)

OTHER PUBLICATIONS

Office Action from U.S. Appl. No. 11/279,071 mailed Apr. 14, 2009.

(Continued)

*Primary Examiner* — Andrew Joseph Rudy
(74) *Attorney, Agent, or Firm* — Alston and Bird, LLP

(57) ABSTRACT

A system of the invention comprises a design module, execution engine, and performance management module. A first computer hosts the design module which enables a user to define attributes, queries, and decision rules transmitted to the execution engine hosted on a second computer remote to the first computer. The second computer can be located at a credit bureau, credit reporting agency, or other data provider. The second computer runs the execution engine to query a data repository with the user-defined attributes and queries, and applies the user-defined decision rules to produce result data transmitted to a third computer hosting the performance management module for monitoring performance of a benefit or offering made with the result data and the corresponding attributes, queries, and decision rules that generated the result data.

22 Claims, 22 Drawing Sheets

U.S. PATENT DOCUMENTS

| | | | |
|---|---|---|---|
| 7,143,063 B2 * | 11/2006 | Lent et al. | 705/38 |
| 7,222,092 B2 | 5/2007 | Grove et al. | |
| 7,234,065 B2 * | 6/2007 | Breslin et al. | 713/193 |
| 7,254,555 B2 | 8/2007 | Field | |
| 7,280,980 B1 * | 10/2007 | Hoadley et al. | 705/38 |
| 7,505,938 B2 * | 3/2009 | Lang et al. | 705/38 |
| 7,505,939 B2 * | 3/2009 | Lent et al. | 705/38 |
| 7,546,266 B2 * | 6/2009 | Beirne et al. | 705/37 |
| 7,610,229 B1 * | 10/2009 | Kornegay et al. | 705/38 |
| 7,756,781 B2 * | 7/2010 | Lent et al. | 705/38 |
| 7,774,270 B1 * | 8/2010 | MacCloskey | 705/38 |
| 2002/0046089 A1 | 4/2002 | Zorn | |
| 2002/0049701 A1 | 4/2002 | Nabe et al. | |
| 2002/0147669 A1 | 10/2002 | Taylor et al. | |
| 2004/0030649 A1 | 2/2004 | Nelson et al. | |
| 2004/0128230 A1 | 7/2004 | Oppenheimer et al. | |
| 2005/0086579 A1 | 4/2005 | Leitner et al. | |
| 2006/0080233 A1 | 4/2006 | Mendelovich et al. | |
| 2006/0136330 A1 | 6/2006 | DeRoy et al. | |
| 2006/0155598 A1 | 7/2006 | Spurr et al. | |
| 2006/0267999 A1 | 11/2006 | Cash et al. | |
| 2006/0293979 A1 | 12/2006 | Cash et al. | |
| 2007/0030282 A1 | 2/2007 | Cash et al. | |

OTHER PUBLICATIONS

Office Action from U.S. Appl. No. 11/279,071 mailed May 25, 2010.
International Preliminary Report on Patentability from corresponding International Application No. PCT/US06/17882 dated May 10, 2007.
Office Action from U.S. Appl. No. 11/279,071 mailed Nov. 17, 2009.
Office Action from U.S. Appl. No. 11/279,076 mailed Aug. 31, 2010.
Office Action from U.S. Appl. No. 11/279,073 mailed Aug. 31, 2010.
Notice of Allowance U.S. Appl. No. 11/279,071 mailed Sep. 23, 2010.
Office Action from U.S. Appl. No. 11/279,076 mailed Mar. 2, 2011.

* cited by examiner

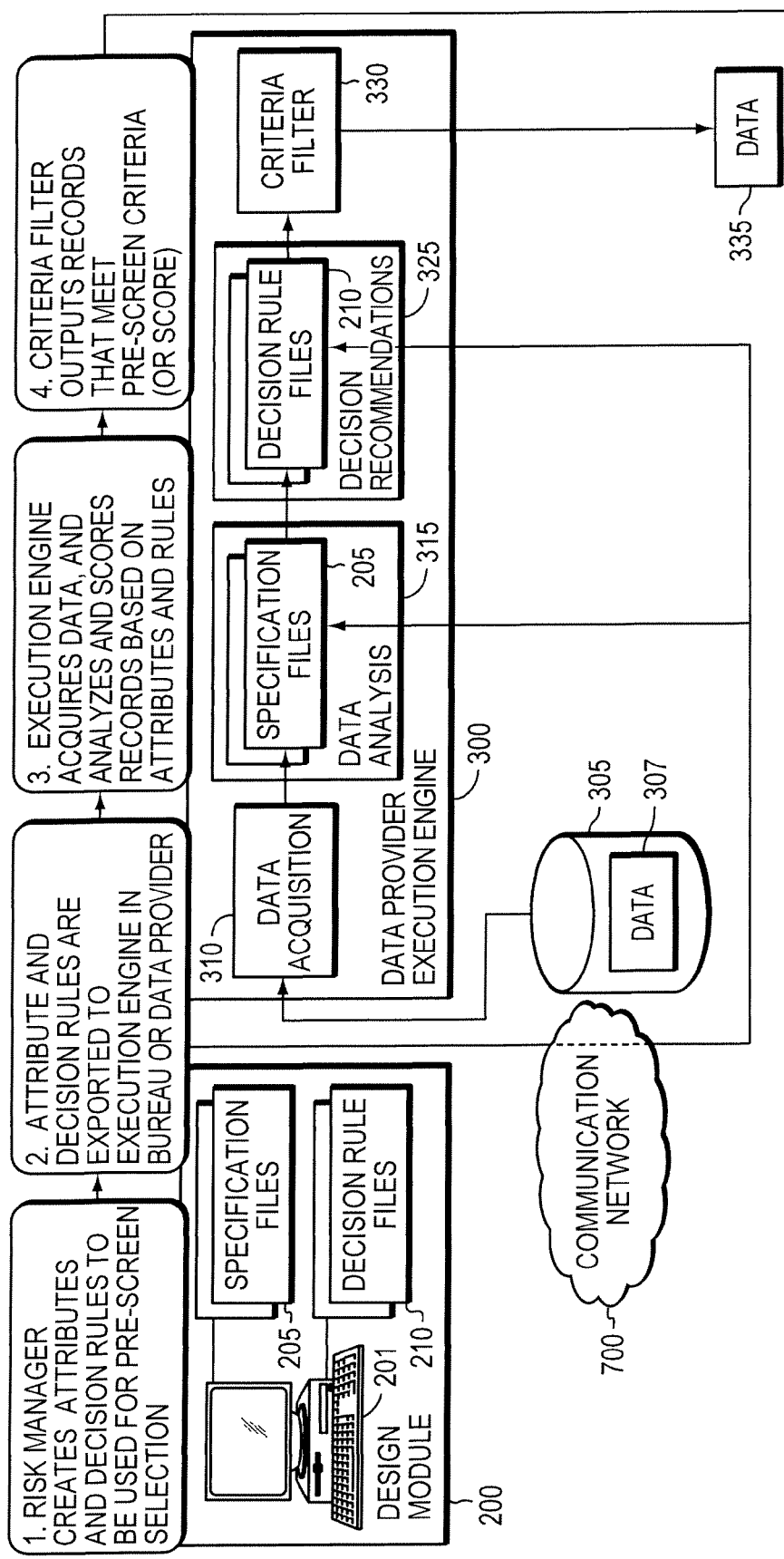
FIG. 2A-I

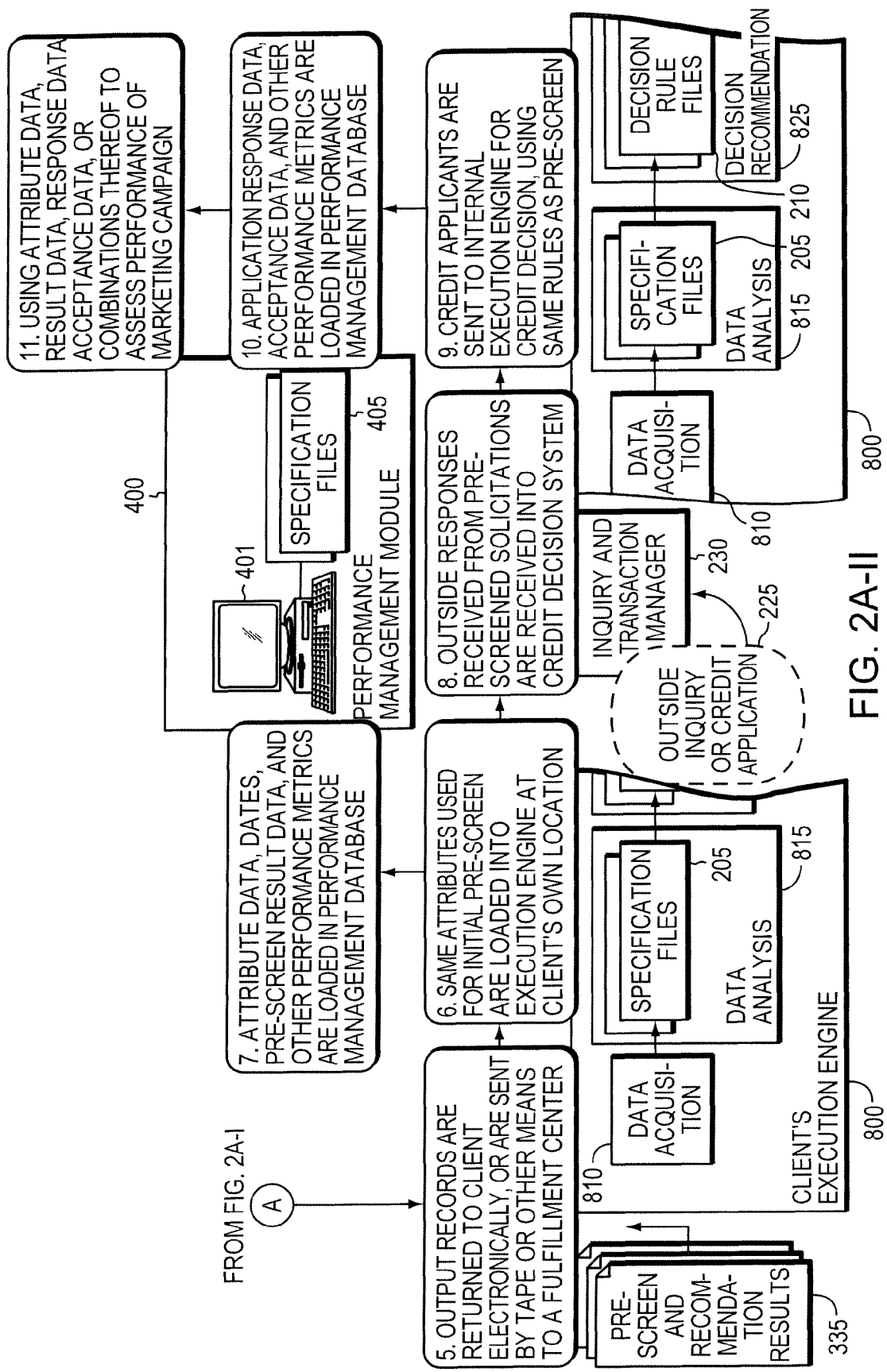
FIG. 2A-II

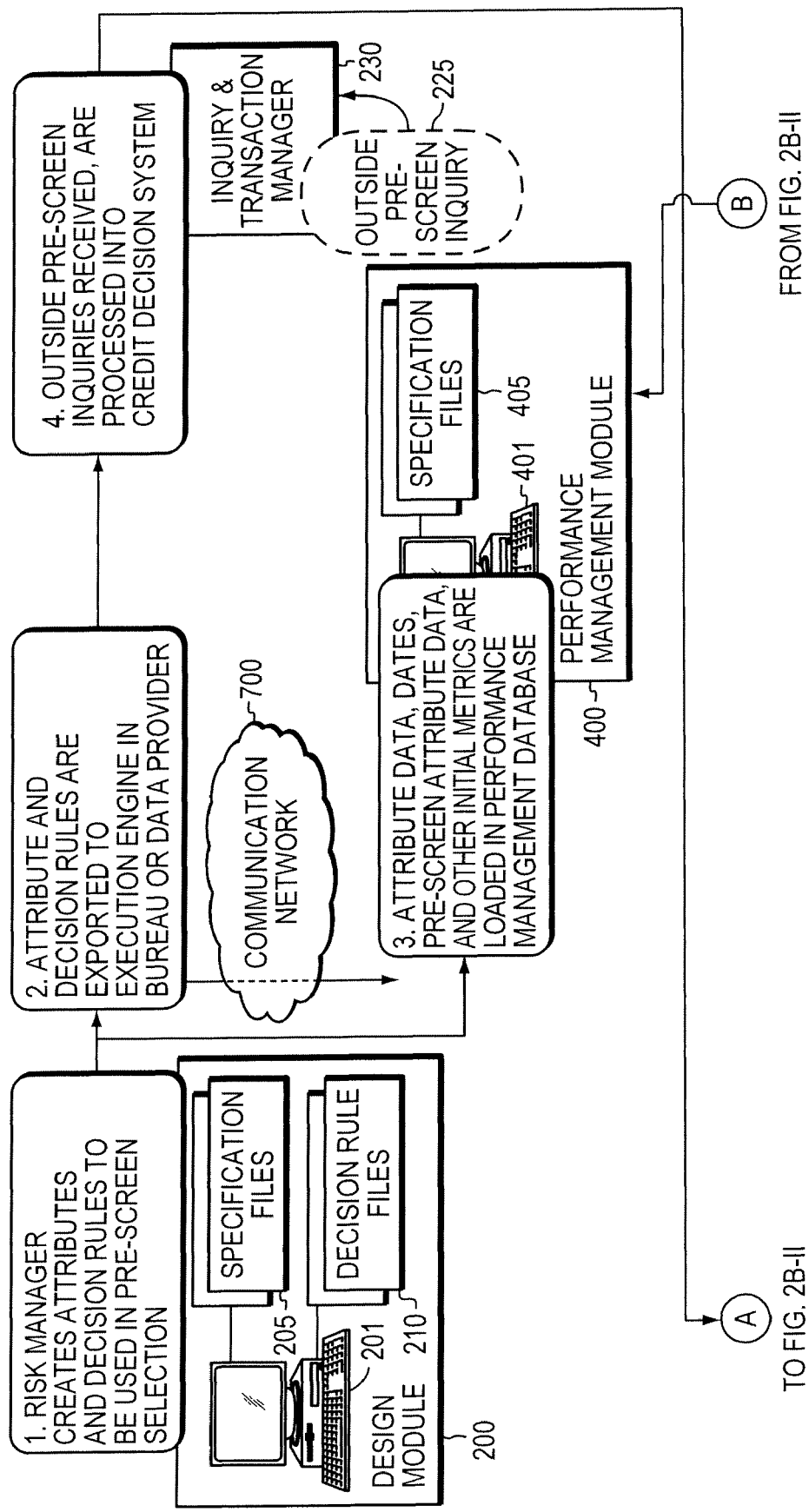
FIG. 2B-I

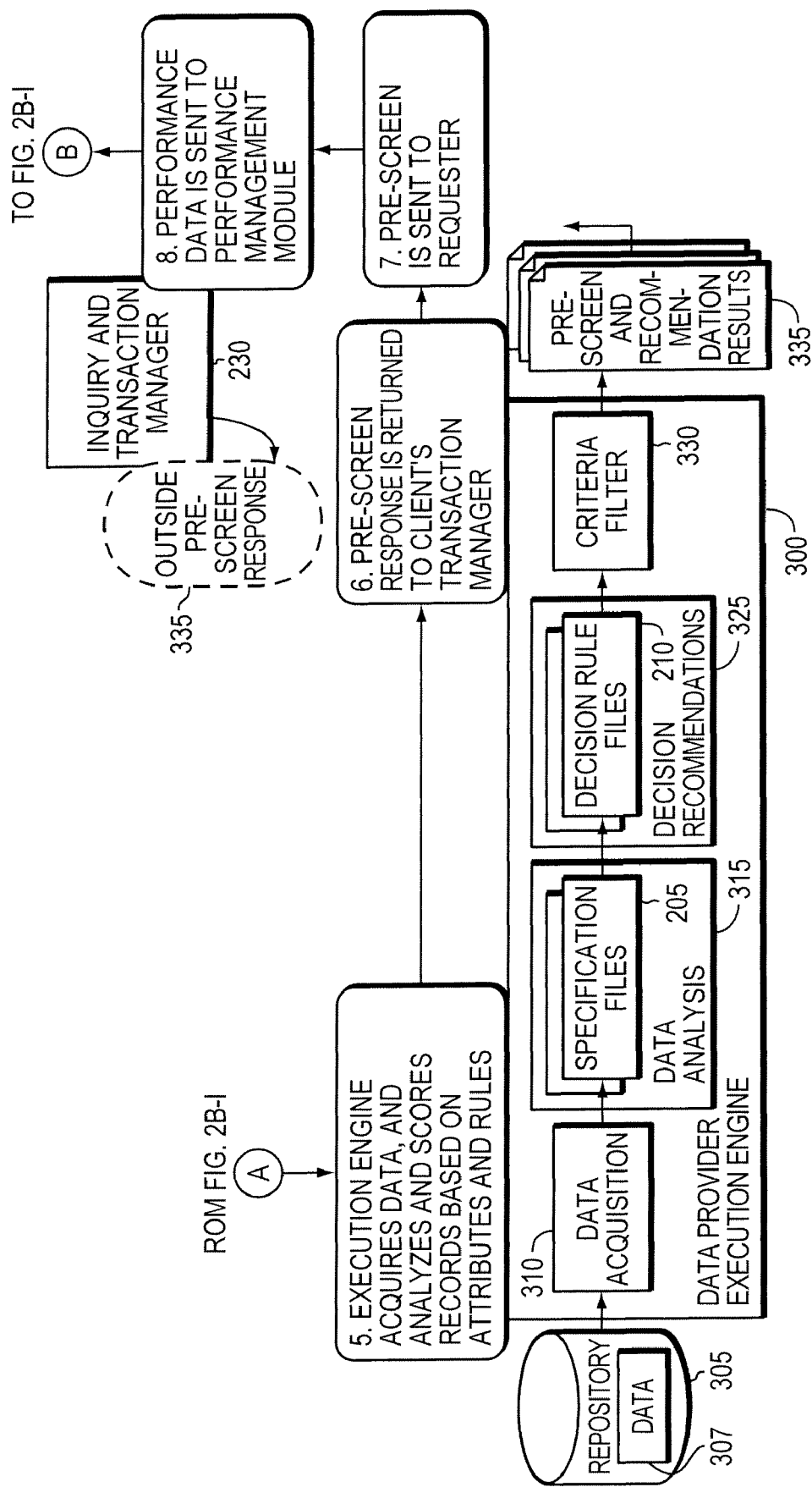
FIG. 2B-II

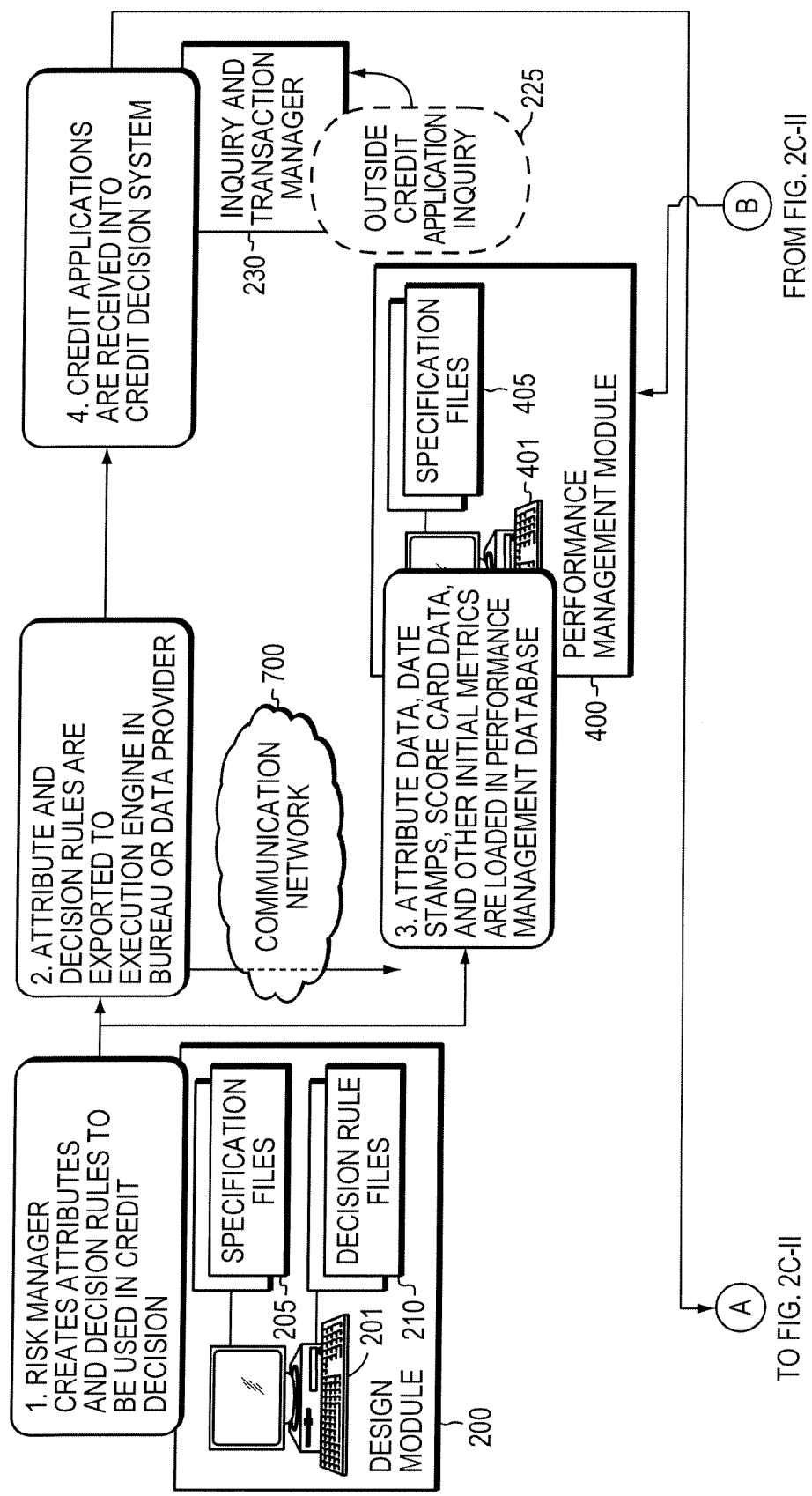
FIG. 2C-I

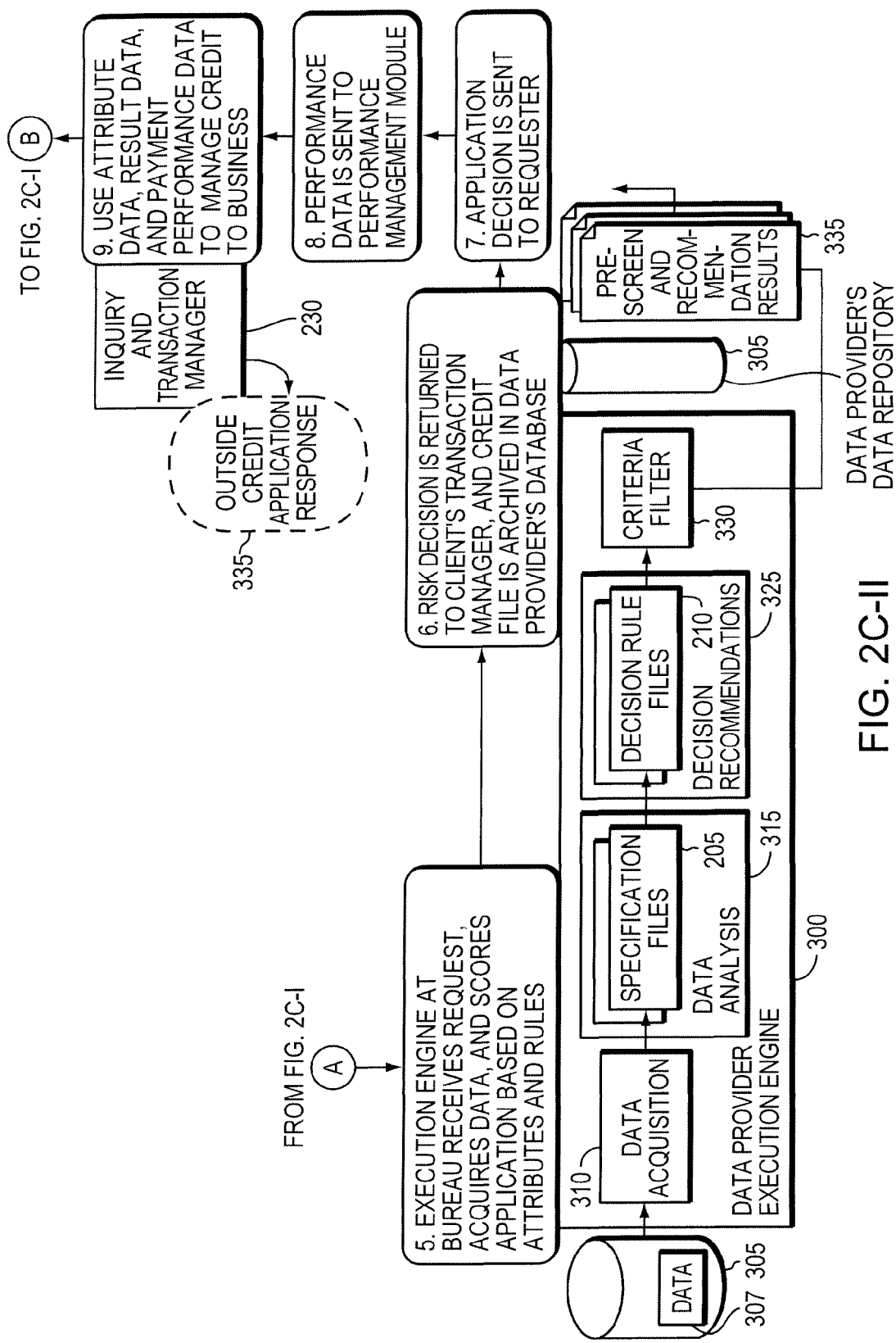
FIG. 2C-II

FIG. 3A

Code Table Specification — 240, 255

Data Provider: Equifax
Version: 5.0
Table Name: Industry Codes
Description:
MCF Field(s) To Map: — 242

Dropdown list (243):
- General Risk Model Reject Codes
- Hit and No Hit Indicator Codes
- ID Advisor and ID Advisor Plus Counters
- ID Advisor and ID Advisor Plus Warnings
- Industry Codes
- InScore 2.0 Auto Reason Codes
- InScore 2.0 Auto Reject Codes
- INSCORE 3.0 AUTO REASON CODES Model ID: N/A Buttons (248): New..., Copy..., Delete, Edit...

Enter Alphanumeric codes — 247
Add    Remove — 245

Save    Close

Code / Description — 246

| Code | Text Translation |
|---|---|
| AL | TIRE DLR/TBA |
| AU | AUTO DLR-USD |
| AZ | MISC |
| B | BANK |
| BB | BANK |
| BC | BANKCARD |
| C | CLOTHING |
| CG | GEN. CLOTHG |
| CS | SPEC. CLOTHG |
| CZ | MISC. CLOTHG |
| D | DEPARTMENT & VARIETY |

_Operand List Specification_

Client: 0000   Site: 000

Data Provider: Equifax
Version: 5.0
Code Table: Industry Codes
Description: LIST OF INDUSTRY CODES — 245

— 241
Put In the text description — 243

| Code | Description |
|---|---|
| 98 | |
| A | AUTOMOTIVE |
| AF | FARM IMP DLR |
| AL | TRUCK DLRS |
| AN | AUTO DLR-NEW |
| AP | AUTO PARTS |
| AR | AUTO REPAIR |
| AS | SERVICE STAT |
| AT | TIRE DLR/TBA |
| AU | AUTO DLR-USD |
| AZ | MISC |

— 244

251: <<  <  >>  >

Data Provider: Equifax
Version: 5.0
List Name: BANKCARD
Description:

| Code | |
|---|---|
| B | BANK |
| BB | BANKCARD |
| BC | BANKRUPTCY CODES |
| C | COLLECTION CODES |
| | FINANCE-MANUFACTURER |
| | FINANCE-PERSONAL |
| | FORECLOSURE CODES |
| | MAJOR PUB REC DEROG CODE |

— 252

253 / 254: New... | Copy... | Delete | Edit...

Save  Close

M Variable Specification

Agent: 0000    Site: 000

Variable Name: Accumulate Bankcard Balance

Data Provider: Equifax

Version: 5.0

Segment / Output File: TRD - Trade Information

- New
- Copy...
- Extend Variable
- Delete
- Save
- History...
- Cancel
- Reorder Specification | Sets | Comment Function Used: Accumulator (Processor) - OBNT0003

Set #: 1 of 1

- Add
- Remove

| Parameter Name | Data Type | Option | Value |
|---|---|---|---|
| Numeric Field | N | Required | BALANCE |
| Numeric Field | N | Optional | |
| Numeric Field | N | Optional | |
| Numeric Field | N | Optional | |
| Numeric Field | N | Optional | |

Parameters | Rules

Reset

| Parameter Name | Parameter Name |
|---|---|
| Accumulate Field 1 | Numeric Field |
| Accumulate Field 2 | Numeric Field |
| Accumulate Field 3 | Numeric Field |
| Accumulate Field 4 | Numeric Field |
| Accumulate Field 5 | Numeric Field |
| Accumulate Field 6 | Numeric Field |

Close

FIG. 3D

M Output File Mapping

Client: 0000  Site: 280
File Name: CBSUM ▼  EOF: 574
File Description:

| Map | Variable Name |
|---|---|
| ✓ | ALTERNATE BUREAU 2 |
| ✓ | BANKRUPTCY FLG |
| ✓ | BANKRUPTCY FLG2 |
| ✓ | BUREAU DOB |
| ✓ | BUREAU HIT FLG |

⇨ 243

☐ New    ✗ Delete
✎ Edit...

Result Field Name

Flag (Y or N)

Search: Variable Name ▼ [ ] Go

➕ Add    ➖ Remove    💾 Save

| Variable Name | Result Fi | Output Fi | Result St | Result Li | Data Type | File Start | Field Len | File End |
|---|---|---|---|---|---|---|---|---|
| DEFAULT NUMERIC | Accumul... | SV-PAGE. | 1 | 3 | N | 25 | 2 | 26 |
| DEFAULT NUMERIC | Accumul... | SV-PAGE. | 1 | 3 | N | 27 | 1 | 27 |
| DEFAULT NUMERIC | Accumul... | SV-PAGE. | 1 | 3 | N | 28 | 2 | 29 |
| BANKRUPTCY FLG | Flag (Y o | SV-BANK. | 1 | 1 | A | 30 | 1 | 30 |
| COLLECTION FLG | Flag (Y o | SV-TR-C... | 1 | 1 | A | 31 | 1 | 31 |
| FORECLOSURE FLG | Flag (Y o | SV-FRCL. | 1 | 1 | A | 32 | 1 | 32 |
| COUNT OF TRADE MAJOR... | Count | SV-MAJ... | 1 | 3 | N | 33 | 3 | 35 |
| COUNT OF TRADE MINOR... | Count | SV-MIN-D | 1 | 3 | N | 36 | 3 | 38 |

⇦ Close

M DECISION ASSISTANT - Decision Rule Set Repository

File  Edit  Repository  Business Unit  Tools  Windows  Help

Business Unit: 0000000   Client: 0000   Site: 000

Decision Rule Set Repository

Decision Rule Sets

- Judgmental
  - 001
  - 003
  - DETERMINE CONSUMER OR BUSINESS
  - EXPERT MODEL CLIENT CUTOFF
  - EXPERT MODEL CLIENT ROUTER
  - EXPERT MODEL SCORECARD ROUTER
  - EXPERT MODEL SCORECARD ROUTER
  - FINAL BUSINESS DESIGN ID
  - FINAL BUSINESS DESIGN ID (025)
  - FINAL DESIGN ID
  - MAIN BUSINESS EVALUATION CARD
  - SET GENERAL RISK & EXECUTE
  - SET INSTALLMENT FLAG & EXECUTE
  - SET NON-PRIME FLAG & EXECUTE
  - SET REVOLVING FLAG & EXECUTE
- Statistical
  - ANGIE TEST
  - ANGIE TEST (00)
  - ANGIE TESTING
  - DEBT RATIO AND CREDIT LIMITS
  - EXPERT MODEL AUTOMOTIVE CARD
  - EXPERT MODEL GENERAL RISK CARD
  - EXPERT MODEL INSTALLMENT CARD
  - EXPERT MODEL NON-FAIC CARD
  - EXPERT MODEL REVOLVING CARD
  - EXPERT MODEL SCORECARD ROUTER
  - LARRY'S VIEW SCREEN ADD TEST
  - LARRY'S VIEW SCREEN ADD TEST (001)
  - MAIN CONSUMER EVALUATION CARD1
  - TEST CARD
  - TEST SCORE CARD

DETERMINE CONSUMER OR BUSINESS x

Type: Judgmental   Effective Date: 2/6/2004 2000 OU 05 000 00:000

Description:
Created By: Unidentified User on 12/6/2004 008:53:54   Last Modified: Peter Gray 12/06/2004 0 09:53:57

☑ Show Host Rules  ☐ Use User Field Names in Rules ← 243

- 001 Group 1
  - 001 if CD=S1T1=ID=DD x goto est BUSINESS EVALUATION CARD
    - MAIN BUSINESS EVALUATION CARD
  - 001 Group 1
    - 001 if CSV=BANKRUPTCY=Y then STATUS=2 REASON=10 x or
  - 002 Group 2
    - 001 if CSV-BANKRUPTCY=Y = goto est FINAL BUSINESS DECISION ID
      - FINAL BUSINESS DECISION ID
    - 002 Group 2
      - 001 if CSV-BANKRUPTCY<>Y then STATUS=A x or
    - 003 Group 3
      - 001 Store [STATUS] in SV-STATUS-CODE
  - 003 Group 3
    - 001 if CSV-RISK-SCORE>=1500 then STATUS=C1 x or
  - 004 Group 4
    - 001 if CSV-RISK-SCORE>=1500> goto group GROUP 11
      - 001 Group 19
        - 001 Store 20000 in SV-CREDIT-LIMIT
        - 002 goto FINAL BUSINESS DECISION ID
          - FINAL BUSINESS DECISION ID
      - 001 Group 1
        - 001 if CSV= BANKRUPTCY=Y then STATUS=A x or
      - 002 Group 2
        - 001 Store [STATUS] in SV-STATUS-CODE
      - 003 Group 3
        - 001 Store [REASON] in SV-ADVERSE-ACTION_CODE-AREA x end
  - 001 Store [REASON] in SV-ADVERSE=ACTION=CODE=AREA x end

← 210

DECISION ASSISTANT 3.0 ready...logged in as Peter Gray

Start  Peter A. Gray   ☐ Application  ☐ Document  ☐ DP   96%   10:29 AM

M DECISION ASSISTANT - Code File Repository

File  Edit  Repository  Business Unit  Tools  Windows  Help

Business Unit  000000000 ▼   Client: 0000   Site: 000

Code File Repository

Code File  [ Resolution ▼ ]  — 2054

Last Modified: Pete Gray on 12-8-2004 0 06 53:38

| Code | Translation |
|------|-------------|
| 01 | INSUFFICIENT LENGTH OF CREDIT HISTORY |
| 02 | xxx Code added during input xxx |
| 03 | RECENT DELINQUENCY |
| 04 | TOO MANY NEW ACCOUNTS |
| 06 | xxx Code added during import xxx |
| 07 | TOO MANY RECENT CREDIT CHECKS |
| 08 | SERIOUS DELINQUENCY DEROG PUBLIC REC OR COLLECTION |
| 09 | DELINQUENCY |
| 10 | INSUFFICIENT ACCTS OR LACK RECENT BANKREV ACTIVITY |
| 12 | PAST USE DUE BALANCES |
| 13 | INSUFFICIENT NAME OR ACCOUNTS |
| 14 | INSUFFICIENT LOW BANKREV HIST OR LACK BANKREV ACCT |
| 15 | xxx Code added during import xxx |
| 18 | BANK REVOLVING UTILIZATION RATIO IS TOO HIGH |
| 19 | RETAIL REVOLVING UTILIZATION RATIO IS TOO HIGH |
| 20 | RECENT SERIOUS DLQ DEROG PUBLIC REC OR COLLECTION |
| 21 | TOO MANY NEW ACCOUNTS WITH A BALANCE |
| 22 | INSUFFICIENT BANKREV ACCTS WITH LARGE CREDIT BALANCE |
| 23 | INSUFFICIENT CREDIT HISTORY |
| 24 | RESIDENCE TYPE |
| 25 | TOO MANY BANKREV ACCTS WHERE UTILIZATION TOO HIGH |
| 26 | LACK RETAILREV ACCTS OR RECENT RETAILREV ACTIVITY |
| 27 | TERM OF LOAN TOO LONG |
| 28 | INSUFFICIENT BANKING RELATIONSHIP |
| 29 | RATIO OF LOAN TO VALUE TOO HIGH |
| 30 | RATIO MONTHLY CARPAYMENT TO TOTAL INCOME TOO HIGH |
| 33 | RATIO OF SATISFACTORY ACCTS TO TOTAL ACCTS TOO LOW |
| 35 | TOO MANY ACTIVE ACCOUNTS |
| 38 | TOO MANY ACCOUNTS WHERE UTILIZATION IS TO HIGH |

Priority column: all rows 00

DECISION ASSISTANT 3.0 ready ...logged in as Pete Gray

Start   Peter A Gray   Application   Document 1   2   Desktop   96%   10:29 AM

FIG. 3N

M DECISION ASSISTANT - Export

File  Edit  Repository  Business Unit  Tools  Window  Help

M Export

Business Unit: 00000000 [View File]  Client: 0000  Site: 0010

Export File Location: <Select Export File Location>  [Start]

[Select All]  [Deselect All]  Rule Set Sufficient Count: 2  ☐ Decision Rule Set changed since last export

*Double click row to view dependency free

| Export | Rule Set | Last Modified | Last Exported |
|---|---|---|---|
| ☐ | ANGIE TESTING | 12-8-2004 @ 09:53:57 | Unavailable |
| ☐ | EXPERT MODEL GENERAL RISK CARD | 12-8-2004 @ 09:53:57 | Unavailable |
| ☐ | EXPERT MODEL SCORECARD ROUTER | 12-8-2004 @ 09:53:57 | Unavailable |
| ☐ | EXPERT MODEL CLIENT ROUTER | 12-8-2004 @ 09:53:57 | Unavailable |
| ☐ | EXPERT MODEL CLIENT CUTOFF | 12-8-2004 @ 09:53:57 | Unavailable |
| ☐ | EXPERT MODEL REVOLVING CARD | 12-8-2004 @ 09:53:57 | Unavailable |
| ☐ | EXPERT MODEL AUTOMOTIVE CARD | 12-8-2004 @ 09:53:57 | Unavailable |
| ☐ | EXPERT MODEL INSTALLMENT CARD | 12-8-2004 @ 09:53:57 | Unavailable |
| ☐ | EXPERT MODEL NON-PRIME CARD | 12-8-2004 @ 09:53:57 | Unavailable |
| ☐ | ANGIE TEST | 12-8-2004 @ 09:53:57 | Unavailable |
| ☐ | SET GENERAL RISK & EXECUTE | 12-8-2004 @ 09:53:57 | Unavailable |
| ☐ | DETERMINE CONSUMER OR BUSINESS | 12-8-2004 @ 09:53:57 | Unavailable |
| ☐ | MAIN BUSINESS EVALUATION CARD | 12-8-2004 @ 09:53:57 | Unavailable |
| ☑ | FINAL BUSINESS DECISION ID | 12-8-2004 @ 09:53:57 | Unavailable |
| ☑ | MAIN CONSUMER EVALUATION CARD1 | 12-8-2004 @ 09:53:57 | Unavailable |
| ☐ | DEBT RATIO AND CREDIT LIMITS | 12-8-2004 @ 09:53:57 | Unavailable |
| ☐ | SET AUTO LOAN FLAG & EXECUTE | 12-8-2004 @ 09:53:57 | Unavailable |
| ☐ | SET INSTALLMENT FLAG & EXECUTE | 12-8-2004 @ 09:53:57 | Unavailable |
| ☐ | EXPERT MODEL SCORECARD AND ROUTER (015) | 12-8-2004 @ 09:53:57 | Unavailable |
| ☐ | TEST CARD | 12-8-2004 @ 09:53:57 | Unavailable |
| ☐ | 005 | 12-8-2004 @ 09:53:57 | Unavailable |
| ☐ | LARRY'S VIEW SCREEN ADD TEST | 12-8-2004 @ 09:53:57 | Unavailable |
| ☐ | TEST SCORE CARD | 12-8-2004 @ 09:53:57 | Unavailable |
| ☐ | 004 | 12-8-2004 @ 09:53:57 | Unavailable |

DECISION ASSISTANT 3.0 ready ...logged in as Pete Gray

FIG. 3O

SYSTEM AND METHOD FOR DEFINING ATTRIBUTES, DECISION RULES, OR BOTH, FOR REMOTE EXECUTION, CLAIM SET III

CROSS REFERENCE TO RELATED APPLICATIONS

This patent application is a U.S. nonprovisional application that claims priority under Title 35, United States Code §119(e) to U.S. provisional application No. 60/684,309 filed May 24, 2005 naming Joseph Larry Cash, Edith Dallas Ryan, and Ray F. Bridenbaugh, Jr. as inventors.

BACKGROUND OF THE INVENTION

Some businesses require credit- or marketing-related data from credit bureaus or other third party credit reporting agencies (CRA), and data providers, in a transactional manner. These enterprises have individual applicants or customers for which credit checks are required, and submit requests for individual credit reports for each customer as needed in the course of their businesses. An example of this kind of business is automobile retailing in which sales personnel perform an online pre-screen on a potential purchaser to determine the individual's ability to purchase an automobile, the class of automobile they can afford to buy, etc. In other businesses, the request for credit or consumer data is carried out on a large scale or 'batch' basis rather than individually. Applications are accumulated, and are then sent in batches to a credit bureau for processing. In some marketing activities such as sales and credit solicitations, large-scale data queries are performed by the data provider on behalf of the requesting companies prior to carrying out such marketing to identify applicants with the desired characteristics so that the number of applicants produced from such marketing campaign will be worthwhile in relation to the costs of generating those applicants. An example of businesses engaged in large scale solicitations of this nature are credit card companies that send mass communications or mailings to prospective applicants and then select among applicants those to which to offer credit.

Pre-screens, as opposed to obtaining full credit reports, of prospective customers and applicants are performed by these businesses because applicable laws such as the Fair Credit Report Act (FCRA) define certain requirements for such solicitations, and the manner in which consumer credit data can be used under the FCRA. In any situation lacking an application for a benefit sought by permission of the consumer evidencing the consumer's consent, the FCRA prohibits access to an individual's credit or consumer report. For credit marketing purposes, the FCRA allows the credit file to be used in making business decisions regarding the consumer, but the FCRA prohibits the business from accessing the consumer's credit file directly, without the consumer's explicit permission. Thus pre-screening of candidates using a credit bureau or other CRA or data provider is an important step in the process of evaluating the pool of potential applicants that may receive applications for a benefit such as a credit card, etc. in a marketing campaign. Similar consumer protection and privacy laws in countries other than the United States of America restrict access to consumer credit information.

For large pre-screen activities, businesses generally make requests that are provided manually to the bureau, CRA, or data provider, and the bureau's own staff is required to program the attributes to define the data inquiry. This takes both time and resources for the bureau, CRA or data provider, and results in added cost and delays for the company desiring the data. In addition, if pre-screened data inquiries are made of multiple data bureaus, the need for each bureau's staff to program the attributes results in attributes that are not consistent from one data provider to another.

Additionally, when these attributes are programmed at the credit bureau, the requesting company encounters difficulty in duplicating the same attributes for their own use, in their internal system, when making the determining decision for respondents to the solicitation campaign. This provides adverse consequences to businesses, because they are required under FCRA to apply the same criteria used in solicitation as they use in accepting applicants. Inability to match the attributes used to generate a pool of applicants with the attributes used to accept applicants under an offer can result in violation of the FCRA and other laws.

In addition, by requiring the requesting company to rely on the credit bureau's, CRA's or data provider's internal IT staff, much of the desired control and capacity to react quickly to changes in business environment is removed from the company making the request. This manual effort is a significant barrier to the flexibility and speed with which these types of data inquiries should be pulled in order to respond to market conditions. Consequently, significant resources are presently wasted because of a lack of automation to permit interaction and coordination between the involved individuals, the enterprise platforms, and bureau's, CRA's and data provider's computer systems.

Every pre-screen request for large data inquiries and batch processes used for marketing and solicitation involves complex communication between the requesting company and the credit bureau, CRA or data provider. There is a request, development, and approval process that must be followed for each request for data. In addition, as mentioned, these companies must also use the same attributes used for the pre-screen in the approval process once the solicited applicant applies. Not only is this necessary from a business point of view, it is also required under the FCRA and other consumer regulations. Some companies make these large data requests on a weekly basis, requiring complex tracking of the different attributes being requested, and the results and performance of the data, based upon the attributes used. This process often results in confusion, and in the end, the abandonment of tracking the inquiry performance against the attributes used to initiate the data inquiry. Thus, information that could be useful to the company in conducting its business, or even required by law, is lost. It would be desirable to provide a system that could overcome this problem with previous technologies.

There is a need in some industries to perform a pre-screen of an individual on a transactional basis. A good example is in the automobile retailing industry, as previously mentioned. Currently when a customer arrives at the sales floor at an automobile dealership, in many cases they are asked to fill out a pre-sales application. One aspect of this application is that the customer gives the dealership permission to access and pull their credit report. The dealership uses this credit report as a pre-screening tool to identify the capability of the customer to buy, and the line of vehicles their sales person should be discussing with the customer. This activity is fraught with issues, first and foremost being that there is a high risk that the sales person may not have permissible purpose to access the customer's credit report under the FCRA. This industry, and others like it, requires the ability to prescreen an individual on a transactional basis, and get the results of a pre-screen without pulling the actual FCRA regulated data from the credit and data bureau which raises FCRA compliance issues.

There is also a need to track attributes and report performance of solicitations requiring that the same attributes be used for pre-screening, accepting applications, and evaluating performance of applicants accepted for a benefit or product offering of a business. This is difficult for a business to accomplish if the attributes and rules used in the pre-screening, acceptance, and evaluation process have evolved, as they often do. In addition, the meaning of attributes may vary among credit bureaus, CRAs and other data providers, further obfuscating performance of pre-screen, acceptance, and profitability analyses.

In cases where a decision needs to be made regarding the acceptance of risk or the granting of credit, there are the ongoing issues regarding a copy of an individual's credit data being sent from the safety of a credit bureau, CRA, or data provider's database. Recent events in the credit industry have occurred where a consumer's personal data was sent to fraudsters and other companies for purposes other than FCRA-approved uses. There is therefore a need in the art to provide the capability to better protect consumer's data to the benefit of the business, data provider, and especially the consumer.

Credit grantors have a need for a system in which they can develop and manage their own score cards and attributes, yet conduct the data acquisition and scoring process within the safe confines of a credit bureau's facility. Furthermore, they need a method in which they can develop and test their attribute and scorecard designs on their own desktop system. In addition, credit grantors need a system in which they can have a credit application scored, yet avoid access to the consumer's credit data which may be subject to severe restrictions or prohibited under applicable law.

It would be desirable to provide a system, apparatuses, articles and methods with the capability to overcome the above-identified problems in the prior art.

SUMMARY OF THE INVENTION

Certain embodiments of this invention are implemented with computer systems that request, capture, manage, share, and make decisions based on business enterprise and data information. More specifically, these embodiments relate to a system, apparatuses, articles and methods for allowing a user to manage, create and apply user-defined data queries and query attributes, to data searches being performed by data providers such as credit bureaus, CRAs, or others, and to receive back the resultant data set or decision. These queries and decision processes may occur in a real-time environment or may be run in a batch processing mode, and may include inquiries for multiple applications and applicants or for single inquiries and decisions regarding an individual person. These inquiries and decisions are performed in a manner to allow the result set or the decision recommendation to be made, while minimizing transfer of credit sensitive data from data provider. Some embodiments of the invention further provide the appropriate tools to track the performance of the query and attributes.

In one relatively specific embodiment, a method and system is provided to enable a user to define and communicate attributes used for pre-screening data pulled from credit bureaus or other data sources. The purpose of the pre-screening may vary, and can be for marketing for credit granting and solicitation or other purposes. Additionally, this method and system can be used to screen and decision credit applicants without the risk of passing an individual's credit data to sources outside of the credit bureau, CRA or data provider. It can be implemented as an execution engine, located at the credit bureau, CRA or other data provider, which searches for data using attributes defined and supplied by a remote user.

In other embodiments, a system and method provides for a software-based tool at the user's site which supports the design and management of data selection attributes and the making of pre-screen requests to multiple data providers using the same attributes. These attributes can form the basis for a large, multi-record pre-screen sort, or the inquiry and screening of one individual applicant at a time. These developed attributes are passed to the credit bureau, CRA or data provider facility in an automated fashion, where an execution software engine formats the inquiry into the data provider's format, executes the inquiry against the data provider's database, screens and makes decisions regarding the data, based on the user's own rules, and then reformats and delivers the pre-screen results, and/or the decision recommendation, back to the user without passing the individual applicant's unique credit information or other data to the entity making the request.

One benefit of certain embodiments of these methods and systems is that it allows the user to create attributes that are used for data selection, and place those attributes into production, without the help of information technology (IT) staff, and such attributes can further be used at a wide variety of data sources. This provides the user the capability to create an attribute set, and use that same set multiple times, across multiple data sources (create once, use many). Furthermore, invented embodiments enable the user to attain a much higher level of consistency across their data selection sources. Moreover, the user can automate the data inquiry and decision process. The invented embodiments provide the user with the capability to define and extract bulk data, or single individual data reports, from the credit bureau or other data source, without requiring the intervention of credit bureau staff with attendant delays and costs. In addition, in some embodiments of the invention, inquiries and attributes composing those queries, and the performance of the queries, can be tracked for future reference and repeat performance.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 2A-2C are various flow diagrams indicating how specification files and decision files can be used to generate result data for a marketing campaign in accordance with the invention.

DETAILED DESCRIPTION OF THE INVENTION

Figure 1:
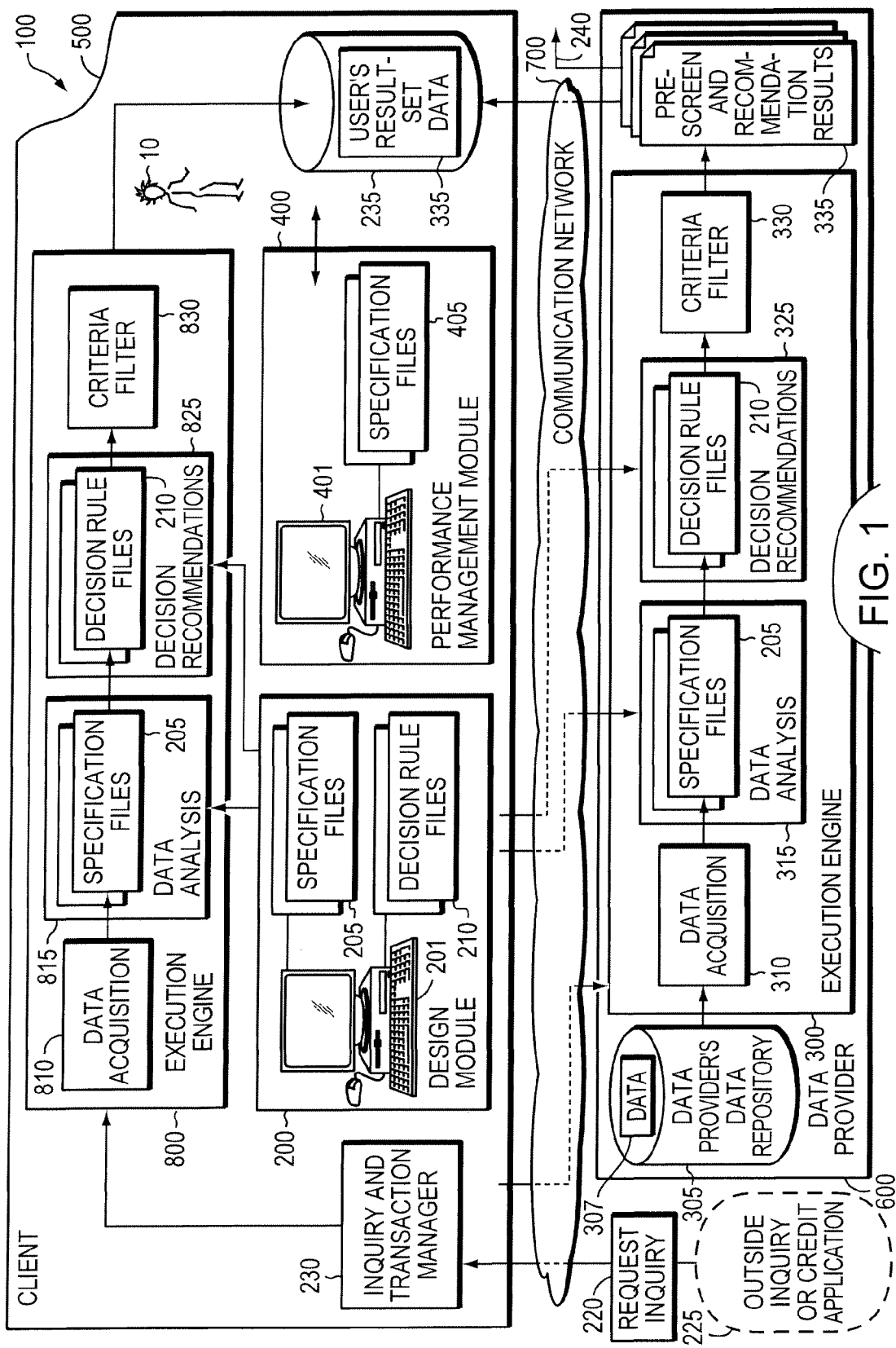
FIG. 1 is a block diagram of a system and apparatuses of the invention showing the design module, execution engine and performance management module in accordance with the invention.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

General Description

The disclosed invention, in its various embodiments, solves the needs and problems of the prior art addressed above. The invention provides a system, apparatuses, articles and methods for defining, communicating, and configuring data queries that can be processed by a computer to generate pre-screens or credit- or risk-based decisions, which can transcend organizations, data bureaus, CRAs, or other data providers, and their specific internal operations.

Various embodiments of the invention provide a system, apparatuses, articles and methods that can allow the credit bureau's, CRA's, or data provider's user to define, configure, and communicate a computer processable data query, for batch or individual pre-screen purposes, to a credit bureau, CRA, or other data providers, and to receive back the result data set in response. Such embodiments also provide the capability to maintain a complete record and audit trail of the attributes and rules used to generate the result data set. Such a combination of a definition system, coupled with the audit trail and performance data, can enable continuous process and business improvement.

Additional embodiments of the invention provide for a system, apparatuses, articles and methods that allow the credit bureau's, CRA's, or data provider's user to define, configure, and communicate a computer-process-able data query, for credit and risk decision purposes, to a credit bureau, CRA, or other data providers, and to receive back the recommended decision, along with appropriate reason codes, based on the credit data in the bureau, without actually sending the bureau data outside of the credit bureau itself. These embodiments may provide the capability to maintain a complete record and audit trail of the attributes and rules used to generate the resultant decision recommendation. Such a combination of a definition system, coupled with the audit trail and performance data, can enable continuous process and business improvement, as well as improved processes for consumer data security.

Additional embodiments of the invention can track the performance and success of an attribute definition, so that as future attribute definitions, decisions, queries, and demographic decisions are made, the business can evolve their selections and make continual improvements, and better business decisions.

Also, various embodiments of the invention are open and extensible, providing the ability for future revisions, added capabilities, or enhancements being made.

System Overview

To meet the goals, the system 100 of this invention has multiple components which are described herein and shown in FIG. 1. For description purposes, the three components are:
(1) the design module 200, which is used at the client's site 500;
(2) the execution engine 300, which runs at the credit bureau, CRA, or data provider's site 600; and
(3) performance management tool 400, which is used at the client's site 500.

The design module 200 is used by the end-user, such as a credit risk manager or marketing analyst of the client 500, to design the specifications for data attribute calculation, the report display format, and the optional rules and score card for credit risk decision rules. These rules for score cards and credit risk decisions are used in response to inquiries 220 generated within the client or received from an external entity 225 through the transaction manager 230. Once the specifications have been designed, a process within the design module is executed, which gathers the design specifications and writes them to several files 205, 210. The computer hosting the design module 200 transfers the files 205, 210 to the data provider, possibly via communication network 700 such as the Internet or a private network, for execution in the data pre-screen or credit risk decision process.

Within the data provider 600, the execution engine 300 operates. This engine executes queries with the user-defined attributes to identify data of interest to the client, and applies the decision rules 210 to generate pre-screen or decision result data 335 which is provided back to the remote client. More specifically, within the data provider 600, the following steps occur:

A. The data acquisition tool 310, in response to an inquiry from the transaction manager 230 transmitted via a communication network 700, queries the repository 305, and retrieves the credit report data 307.

B. The data records are then sent to, and processed through the data analysis module 315 to create the specification files 205 and the human-readable report display (the later being optional), as previously defined by the client using the design module 200.

C. If a risk decision is required, the client's decision rules 210 generated using the design module 200 are applied to the data by decision module 325 of the execution engine 300, and a recommended decision, optionally including codes defining the reason(s) for the decision(s), are formed and output as result data 335.

D. For pre-screen inquires, the data records are filtered by the criteria filter module 330 according to the client's own criteria in files 205 and 210 in order to generate the prescreen list 335.

E. Depending upon the nature of the inquiry 220, which as mentioned can originate within the client or externally from another entity 225, the result data 335 such as a risk decision and reason code, or the resultant pre-screen list, is returned to the user's site 500 and into the performance management tool 400 for the logging of audit trails and performance metrics and the return to the requesting user through the transaction manager 230.

One significant benefit of this system is that it requires no custom programming at the data provider 600. This helps to reduce the time required for the client to generate results 335, and also helps to ensure accuracy of the data because the client has defined the attributes used in generating the results and thus has accurate knowledge of what the attributes signify. In addition, a further benefit is that the credit data used to generate the pre-screen results and the risk decisions, does not need to leave the credit bureau's premises. This helps to ensure the privacy of the consumer's data, which clearly benefits the consumer. In addition, the data provider is required by law to maintain the privacy of the consumer's data, so use of the data without exposing that data outside of the data provider benefits the data provider. The client is benefited because the results 335 can be generated so as to include data controlled by the FCRA and other applicable law, and thus, compliance issues such as data privacy and permissible purposes are simplified for the client.

Design Module 200

As previously mentioned, the design module 200 is a software tool that runs at the user's location 500. The design module 200 has the following basic specifications:

Code Table Specification—The user has the ability to define, edit, copy and delete codes and their text translation for the purpose of then grouping together like codes for use in data attribute definitions and/or display on the human-readable report.

Operand List Specification—The user has the ability to define, edit, copy and delete lists of operands identified by codes for use in the definition of data attributes.

Data Attribute Specification—The user has the ability to define attributes and unique data attribute calculation logic based on the data source/version, and can edit, copy, and delete specifications as needed.

User Defined Display (UDD) Specification—The user has the ability to define the format the data that is to be presented for human-readable purposes. The user can define a summary, page header, page footer, and segment(s) detail displays. The drop and drag user interface allows for simulation of "painting" the requirements for display on a palette. The user defined display capabilities allow for data masking of fields such as dates, telephone numbers, and dollar amounts so formats can be specific to user's desires. Unique display specifications can be defined to satisfy different user group needs such as unique report displays for different departments, product lines, promotions, and data providers.

Result Record Structure—The user can define the data structure(s) layout expected by their application or decision system.

Decision Rule Sets—The user can create decision rules 210 based on data attribute results or other reference-able data. Individual rules can be combined to form rule groups and then further grouped to create decision rule strategies. These rules can be created, edited, and deleted.

Element Definitions—Element definitions are built-in for most common data elements, such as data formats, functions, and data provider codes.

Custom Data Definitions—The user has the ability to create data tables to describe customer specific data to be used in the data attribute calculation process.

Business Unit Management—The user has the ability to create unique code tables, operand lists, data attribute and user-defined display specifications, and decision rules for each organizational segment defined (i.e. business unit, division, product group).

Copy—The user has the ability to copy previously defined data attributes into any other business unit or data provider defined by the user in the design module, and then alter or modify those attributes as he or she desires.

Cross-Referencing—The user has the ability to cross-reference other data attribute definitions and decision rules into a new definition or decision rule group.

Reference Checks—Reference checks are available to help users understand the relationships between various data attributes and decision rules. These checks assist in preventing a user from inadvertently removing an attribute or decision rule that is still being referenced elsewhere.

Display Data Elements—The design module provides the capability to display all data elements retrieved from any or all data providers.

Flat File Export—The design module provides the capability, on the command of the user, to generate a flat file from the defined attributes or decision rules, for the purpose of uploading to the execution engine running on a mainframe or other platform. These flat files are named by the design module with a unique system identifier which will identify the date of creation, and the definitions.

Audit Trail for Flat File—The flat file record used to communicate attributes and decision rules from the design module 200 to the execution engine 300 are maintained for audit and performance management purposes. This file contains the date and time of the attribute/decision rule creation, the author of the attributes/decision rules, as well as all attribute/decision rule definitions.

Inventory—The system maintains an inventory of data attributes and decision rules which allows the user to quickly locate and put to use previously defined specifications.

Multi-platform Support—The design module 200 can be configured to run on a desktop operating system of the user's choice. For example, the design module can be run on a Microsoft Windows-based personal computer, or other platform.

Scheduling—The design module 200 can be used to implement changes scheduled to occur at future dates and times.

User Interface—The user can be presented with a Microsoft Windows style user interface which allows improved usability and easy creation of data attribute specifications 205 and decision rules 210.

Data Management—Full backup and restores of all specifications 205, 210, 405 are supported in the application and can be used to manage change control.

Concurrent User Access Controls—Multiple users have the ability to perform functions in the system at the same time. However, controls are in place to prevent users from updating the same record. Once a specification has been selected by one user, it is locked and other users selecting the same record have a view-only version.

User Security & Permissions—Only users defined to the system have access. User permissions can be maintained in the application to restrict create, edit, copy, and delete functions. Users can be restricted to specific business unit specifications and may have different permissions within different business units.

Security Audit logs—Audit logs are maintained of failed logon attempts.

Execution Engine 300

The execution engine 300 operates at the credit bureau, CRA, or other data provider's location 600. It is installed to operate in a native fashion on the data provider's mainframe or other platform of choice for processing the data inquiries. The execution engine 300 has the following basic features:

Flat File Import—The execution engine 300 has the ability to import a flat file containing attribute definitions from the design module 200, and then interpret the data in the flat file to provide new attributes for filtering data.

Data Analysis—The execution engine 300 has the ability to take data and summarize it, based on the defined attributes (205 file), for further screening. This summarized file is then stored for further filtering.

Screening—The execution engine 300 analyzes the data contained in the attribute file against the attribute definitions imported from the design module 200, filtering for those records that meet the attribute definition. Those records that satisfy the definitions are exported into a data file 335 for delivery back to the client. The exported file is stamped with the audit trail number which identifies the attribute definition as defined by the design module 200 (other related files are similarly stamped with the audit trail number in order to correlate such files so that, for example, attributes and decision rules used to generate a pre-screen list can be matched to attributes and decision rules used to accept applicants or gauge performance of the attribute and decision rule sets in obtaining desired customers).

Testing—The execution engine 300 provides the user with debugging and testing capabilities through which the user can test and validate their data attributes 205 and decision rules 210.

Test Environment—The user can create a test environment for the purpose of validating new data attributes 205. The user can transfer credit reports to this test environment, as needed, for data validation.

Test Facility—The execution engine 300 provides a test facility which will allow for testing of data attributes 205 using retained data.

Audits of Characteristic Results—The execution engine 300 maintains and makes available the full data attribute results with detailed audits for the purpose of testing.

Audits Online—The user is capable of running online audits for error correction and troubleshooting.

Audit Reports—Detailed audits are used to validate the results of data attributes 205 and decision rules 210. During the quality assurance (QA) process, these audits will be available for error resolution.

Format Conversion—The execution engine 300 has the capability to convert raw bureau data 307, extracted from the data provider's data base, into a format used by the performance management module 400 and the design module 200. This formatted data is then used by the execution engine 300 for filtering the data based on the defined attributes.

For support in generating the logic for attributes 205 and decision rules 210, the execution engine 300 also supports the following functions:

Mathematical Functions—absolute value, exponentiation, natural logarithm, rounding (including round-up and round-down), square, and square root. These are functions that receive a numeric input and produce the result by applying the named mathematical function.

Action Functions—Clear and store are action functions that change the data contents of a field. The GOTO function is an action that forces an unconditional change in the sequential flow of the scoring process.

Comparison Function—The IF function compares two values (a field against another field or against a literal) and allows the user to assign a reason codes (optional), point score or status codes and choose a connector based on the user's decision strategy.

Score Functions—Coefficient (characteristics-coefficient product) and expected value are functions used to alter the score or ordering of reasons assigned during scoring.

Calculation function—Performs a linear arithmetic computation and produces a numeric result.

Matrix function—This function produces a two dimensional table that allows a user to examine two variables and set a value in the resulting variable.

Performance Management Module 400

The performance management module 400 is designed to provide future tracking of specific attribute performance in relation to the success of the data pulled from the bureau. The performance management component has the following basic features:

Audit Data Import—The performance management module 400 allows the user to seamlessly import the audit data 205, 210 from the design module 200. This data file contains the audit trail ID, the attributes defined, the author of the attributes, and the associated date and time stamps.

Performance Data Import—The performance management module 400 allows the user to import results data 335 in a flat file for each attribute audit file being tracked. This file contains the number of responses generated from the attribute file, the financial revenue generated from the attribute file, the campaign costs associated with any specific attribute or mailing, the date of the record updates, the default rate of the credit loans associated with the attribute file, and other data deemed necessary for the performance tracking of the campaigns.

Performance Reporting—The performance management module 400 allows the user to view on a screen or in printed reports the performance summary of each attribute. This summary includes the number of solicitations created by the attribute selection, the time associated with the campaign, the cost of the campaign, the gross revenue generated from the campaign, and the net revenue generated from the campaign. The user is also able to use the module 400 to compare the performance of one attribute with the performance of other attributes as defined and selected by the user. The user can 'drill-down' (in other words, obtain further details regarding) specific attribute campaigns to view the specific summary. The user can further drill down below the summary level to view attributes and the data source provider.

Dashboard—The performance management module 400 has the capability of showing a management dashboard which summarizes performance data from the desired date range or campaign selection. This tool provides a summary view of performance and campaign characteristics. When any dashboard item is selected by clicking on it, this selection allows the user to drill down into the data, business objects, and attributes which make up and are responsible for the summary report. The user is able to continue clicking on layers of information until the user drills down through the various layers of data to the data elements or selection criteria which satisfies the user's questions or inquiry.

Attribute Recall—The user is able to use the module 400 to select a past attribute or business object from a performance report or summary, and by clicking on it, open the attribute definition file in the design module 200.

Exemplary Methods and System Operation

FIGS. 2A-I and 2A-II are flow diagrams of a method in accordance with an embodiment of the invention. The method is applied to the system 100 and is thus useful for describing the operation of such system in the context of performing a pre-screen for a marketing campaign. In Step (1) of FIG. 2A-I the user (e.g., risk manager) operates the design module 200 to define the attributes and decision rules 205, 210 to be used for the pre-screen selection to generate result data 335. In Step (2) the user operates the design module 200 to export the defined attribute 205 and decision rules 210 to the credit bureau, CRA, or other data provider 600 to be used to generate result data 335. In Step (3) the execution engine 300 acquires the target data 307 with data acquisition module 310. The execution engine 300 analyzes the data 307 and scores the data records based on the specification rules 205 and decision rules 210. More specifically, the execution engine 300 retrieves the data 307 using the data acquisition module 310. The data acquisition module 310 passes the target data 307 to the data analysis module 315 that applies the specification files 205 with defined attributes to generate the data for further processing. The decision module 325 receives this data and applies the decision rules 210 in order to generate output data reflecting pre-screens or decision(s). The criteria filter 330 applies predefined criteria to the data to generate result data 335 which can be a pre-screen list or recommended decision(s). In Step (5) of FIG. 2A-II the execution engine 300 receives the data records 335 from the execution engine 300 electronically via network communication media such as the Internet, by tape transported via mail, or other means. The data records 335 can thus be delivered to the client's fulfillment center. In Step (6) the same attributes of specification files 205 and decision rules 210 used for the initial pre-screen are loaded into an execution engine 800 at the client's location. In Step (7) the attribute data, dates, pre-screen result data 335, and any other desired performance metrics, are loaded into the database of the performance management module 400. The result data 307 is used to generate marketing solicitations for a campaign. In Step (8) responses from the campaign are received and input into the credit decision system 800 of client 500. In Step (9) credit applicants are sent to the credit decision system 800 for credit decision using the same rules 210 applied for the pre-screen. In step (10) the application response data, acceptance data, and other performance metrics are loaded in the performance management database 400. The performance management module 400 has the data necessary to be useful for managing the campaign or analyzing the campaign results.

FIGS. 2B-I and 2B-II are flow diagrams of a method in accordance with another flow diagram of the invention. In Step (1) the user (e.g., risk manager) creates the attributes 205 and decision rules 210 for use in the pre-screening of prospective or actual applicants on a transaction basis. In Step (2) the attributes 205 and decision rules 210 are exported to the execution engine 300 of the data provider 600. In Step (3) the attribute and decision rule files 205, 210, dates, and possibly other metrics, are loaded into the execution engine 300 of the data provider 600. In Step (4) pre-screen inquiries 225 are received by the client 500 on an individual or transaction basis, and are processed into the credit decision system of the client 500 via the inquiry and transaction manager 230. In Step (5) of FIG. 2B-II the execution engine 300 acquires the data 307 and analyzes and scores the records 307 based on the attributes 205 and rules 210. More specifically, the execution engine's data acquisition module 310 acquires the target data 307, and the data analysis module 315 applies the user-defined attributes and logic in the specification files 205 to identify data of interest to the client. The execution engine 300 applies the user-defined decision rules 210 to determine result data, and applies the criteria filter 330 indicating results to be reported to the user, in order to generate the result data 335. In Step (6) the result data 335 is returned to the client's transaction manager 230. In Step (7) the pre-screen result data 335 is transmitted to the entity from which the inquiry originated (e.g., an automobile retailer). In Step (8) performance management data 335 is received from the data provider 600 and/or the inquirer 225 in response to the prospective customer's performance (e.g., application for credit, acceptance for credit, customer payment performance on the credit, etc.).

FIGS. 2C-I and 2C-II are flow diagrams of a method in accordance with yet another embodiment of the invention. The method of FIG. 2C-I is useful for contexts in which decisions to extend credit are to be made at the data provider 300 under user-defined rules 205 and 210 for a batch of requests for a benefit such as extension of credit. In Step (1) the user (e.g., risk manager) creates the attributes and decision rules 205, 210 to be used to generate result data 335. In Step (2) the attribute and decision rules 205, 210 are exported to the execution engine 300 of the credit bureau, CRA, or data provider 300. In Step (3), the attribute data 205, decision data 210, any date stamps indicating when the data 205 and 210 was created, score card data, and other initial metrics, are loaded into the database of performance management module 400. In Step (4) outside inquiries 225 such as credit applications are received and processed into the credit decision system of the client 500. The credit applications can be received and processed by the inquiry and transaction manager 230. In Step (5) the execution engine 300 at the data provider 600 receives the request, acquires the data responsive to the credit application based on the defined attributes and logic of specification files 205, and scores the credit application based on the user-defined attributes 205 and decision rules 210. More specifically, based on information from the credit application (such as the applicant's name, address, etc.), the execution engine's data acquisition module 310 retrieves relevant data 307 from the data repository 305, and provides the same to the data analysis module 315 which applies attributes and logic 205 to the data to generate a set of data upon which the decision module 325 applies the user-defined decision rules 210 to produce a credit score or the like. The criteria filter 330 extracts selected data relevant to the user's inquiry to generate result data 335. In Step (6) the risk decision is returned to the client's inquiry and transaction manager 230. In Step (7) the transaction manager 230 transmits the pre-screen result data 335 to the requestor 225. In Step (8) the result data 335 is sent to the performance management module 400 to manage the business related to the inquiry 220. In Step (9) the performance management module 400 is used to manage the credit business based on the attribute and logic data, response data, result data, acceptance data, payment performance data reflecting the debtor's performance, etc.

User Interfaces

FIG. 3A is a user interface 240 generated by design module 200 executed by the computer 201 in order to permit a user to maintain a set of codes 241 to be used to define one or more attributes of the specification file 205 and/or provide the equivalent text description on the report display to make the information more clear to a human reader. The user can operate mouse-controlled cursor 243 to select a data provider (e.g., 'Equifax'), a version (e.g., '5.0') of the data provider's codes, the specific code set (e.g., 'Industry Codes') the user wishes to select. A description associated with that code set, as well as how those codes map to the data format ('MCF fields') used by the design module 200 is returned. In the example of FIG. 3A, the user selects 'Industry Codes' and the corresponding codes 241 are shown in the list 244. The codes 241 are computer-usable characters that enable the data provider 600 to communicate corresponding data. Corresponding descriptions 245 can be added which describe the codes 241 in text in a way that is more understandable to a human user. The user has the ability to add codes 241 to the list 244 by using the cursor 243 and keyboard of computer 201 to enter the letters for the code 241 and corresponding description 245, into respective fields 246 and operating the 'Add' control 247. The user can also delete a code 241 and its description 245 from the list 244 by using the cursor 243 to select the code in the list 244, and operating the 'Remove' button 247. A set of codes 241 for an attribute or report display can thus be defined. In addition, using controls 248, the user can select the 'New' button to create an entirely new list of codes 241. The user can also operate the 'Copy' button to copy a set of codes 244 as a starting point for creating a new set of codes. Furthermore, the user can operate the 'Edit' button to modify an existing list 244 of codes 241. In addition, the user can operate the 'Delete' button in order to delete a list 244 of codes 241. As with the other user interfaces described herein, operating the 'Close' button at the bottom of the user interface 240 causes the design module 300 to close the interface window.

FIG. 3B is a user interface 250 generated by the design module 200 executed by computer 201 in order to permit a user to specify from a code list 244 the codes 241 to be used by an attribute assigned to a specification file 205. The user interface 250 includes a list 244 of codes 241 representing portions of data content within a data provider's repository 305. The codes, and corresponding descriptions 245 enable a human user to understand the meaning assigned to the code 241, as previously explained. Controls 251 are software buttons that enable the user to select and de-select codes 241 from the list 244 for inclusion in or deletion from an operand list 252 that will be used in attribute specification. By using mouse-controlled cursor 243, a user can select one of the codes 241 and click the '>' control 251, a software button, to add the code 241 to the list 252 of operands to be used by an attribute for a specification file 205. Selecting the '>>' control 251 adds all of the codes 241 from the list 244 to the list 252 of operands. Selecting one of the codes 241 in the existing operand list 252 and operating the '<' control 251 results in deletion of the code from the operand list 252 and adding of such code to list 244. Selecting the '<<' control 251 with the cursor 243 causes all codes 241 from the existing operand list 252 to be deleted from such list and adds such codes to list 244. Using fields 253, the user can operate the design module 200 to identify the operand list 252 of codes 241 for an attribute by the name of the data provider (e.g. 'Equifax'), the version of the operand codes for that data provider (e.g., '5.0'), the list name (e.g., 'BANKCARD') assigned to the list 252, and a description of the operand list 252 for easier comprehension of the meaning or purpose of the operand list to the human user. Controls 254 provide various capabilities. The 'New' control 254 enables the user to create a new list 252 of operand codes 241. The 'Copy' control 254 enables the user to copy an existing list of operands 252 for a new list 252 to enable the user to re-use a previously defined set of operands, or to enable the user to save time by modifying an existing list of attributes in order to define a new list 252, for example. The 'Edit' control 254 enables the user to modify an existing list 252 of codes 241 for an attribute.

Figure 3C:
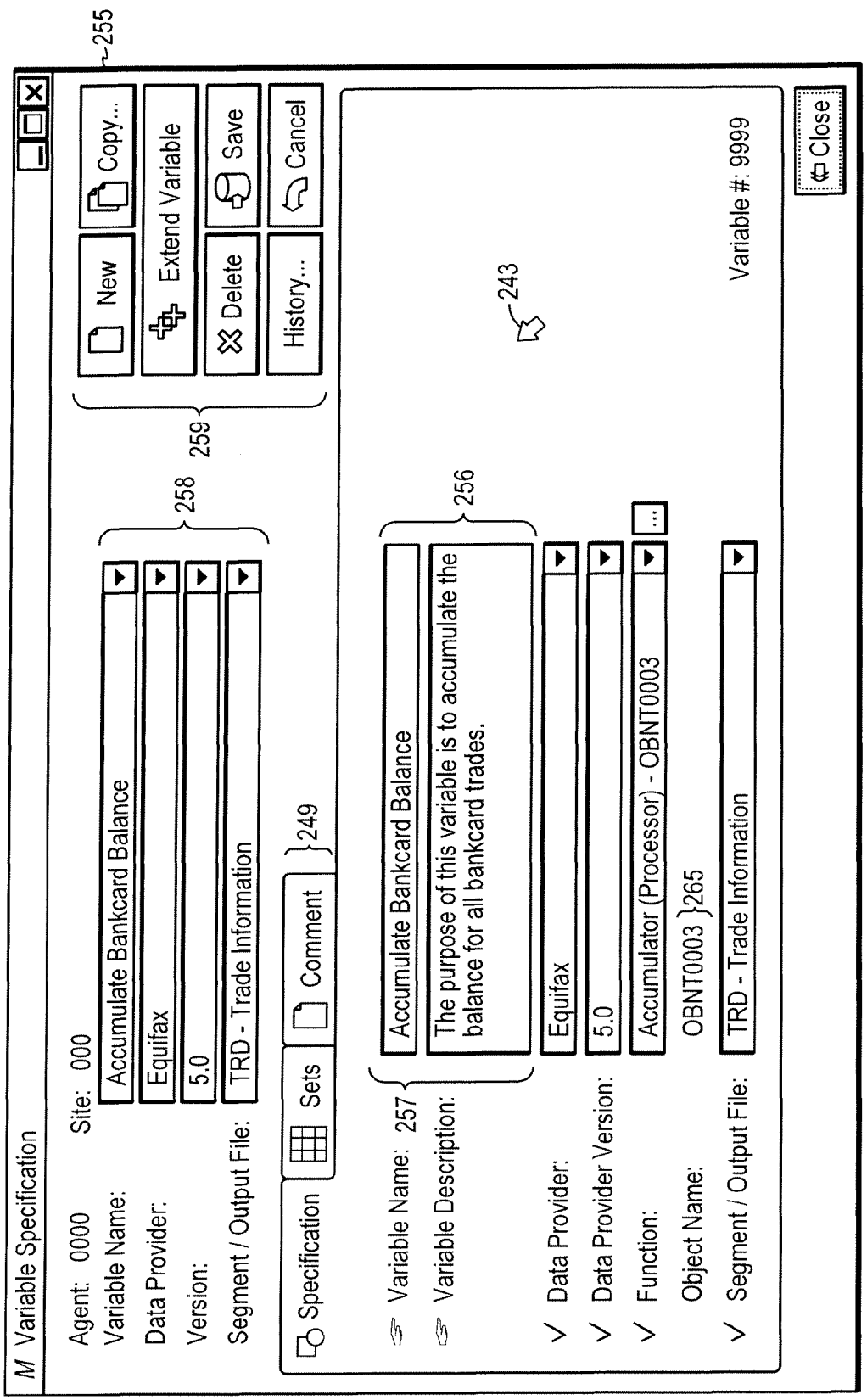
FIGS. 3A-3O are various user interface diagrams indicating various features of the claimed invention.

FIG. 3C is a user interface 255 that enables a user to define an attribute or variable 256 with the design module 200 running on computer 201. The user interface 255 includes fields 257 to enable the user of design module 200 to define the attribute name (i.e., computer-usable code name) and a textual description of the attribute to enable a human user to understand the meaning or purpose of the attribute. Furthermore, the user interface 255 provides fields 258 which enable the user to specify variable name, data provider, version, and segment/output file of the data provider to which the attribute 256 relates. Also included in the user interface 255 is an object or function name 265 (e.g., 'OBNT0003') which defines the logical operation on the data that is to be carried out, for example, by the execution engine 300 at the data provider 600, in order to derive the value to be associated with the attribute 256. For example, the object or function can be an accumulate function that adds values associated with data elements, or an averaging function that averages values associated with data elements, or a function that adds, subtracts, multiplies or divides values associated with data elements, or other mathematical or logical operation. The client and site fields 258 identify the client name and client site for which the variable is relevant, in addition to the name of the variable, the data provider (e.g., 'Equifax') for which it is relevant, the version of the data provider's specification (e.g., 'version 5.0') for which it is relevant, and the segment/output specification file 205 with which the attribute is associated. Controls 259 enable the user to save the new attribute via the 'Save' button, or to cancel the attribute using the 'Cancel' button. The variables specification interface 255 provides various tab selections 249 which enable the user to view 'Specifications', 'Sets', and 'Comment' screens. The user interface 250 of FIG. 3B results from selecting "Variable Specification" from the main menu.

In FIG. 3C the user interface 255 produced by design module 200 running on computer 201 provides the user with the ability to identify any parameters required to calculate the attribute logic. The view of the user interface 255 of FIG. 3C is that resulting on opening a variable specification or selecting the 'Specification' tab. It enables the user to select that data associated with the attribute 256 that the user requires in the result data 335. The controls 259 enable the user to perform various functions. The 'New' control 259 can be activated by the user with a mouse, for example, to create a blank template with fields to receive text to define a new variable. The 'Copy' control 259 enables the user to copy and existing variable for the creation of a new one. The 'Extend Variable' control 259 enables the user to re-purpose an attribute for use in creating other functions. The 'Delete' control 259 enables the user to delete a variable specification. The 'History' control 259 enables the user to review the history of creation and revisions of a variable. The 'Save' control 259 enables the user to save the variable specification and any changes made thereto. The 'Cancel' control 259 enables the user to cancel any changes made to the fields of the template for the variable specification.

In FIG. 3D a user interface 255 is shown after selection of the 'Sets' tab 249 using the design module 200 of the computer 201. Selection of the 'Sets' tab 249 and selection of the 'Parameters' tab 262 results in generation of a list of parameters 264 associated with the function 265 (which in this example is 'Accumulator (Processor)—OBNT0003'). The listed parameters 264 are identified by name (e.g., Accumulate Field 1, Accumulate Field 2, etc.), parameter type (e.g., Numeric Field), data type (e.g., 'N' meaning numeric), 'Option' field indicating whether the parameter is optional or required, and value field identifying the value to be associated with the parameter (e.g., 'BALANCE' is the value to be associated with the result of carrying out the function of accumulating data values in fields, 1, 2, etc.) which are specified for the variable. Operation of the 'Reset' control 267 enables the user to reset a selected parameter 264 to blank fields. Using the 'Add', 'Remove' or 'Reorder' tabs 261, the user can add, remove or reorder sets of parameters/rules. In addition, using the '▲' or '▼' arrows, the user can scroll up or down to view the parameter/rule sets of specifications defined to calculate the attribute result.

Figure 3E:
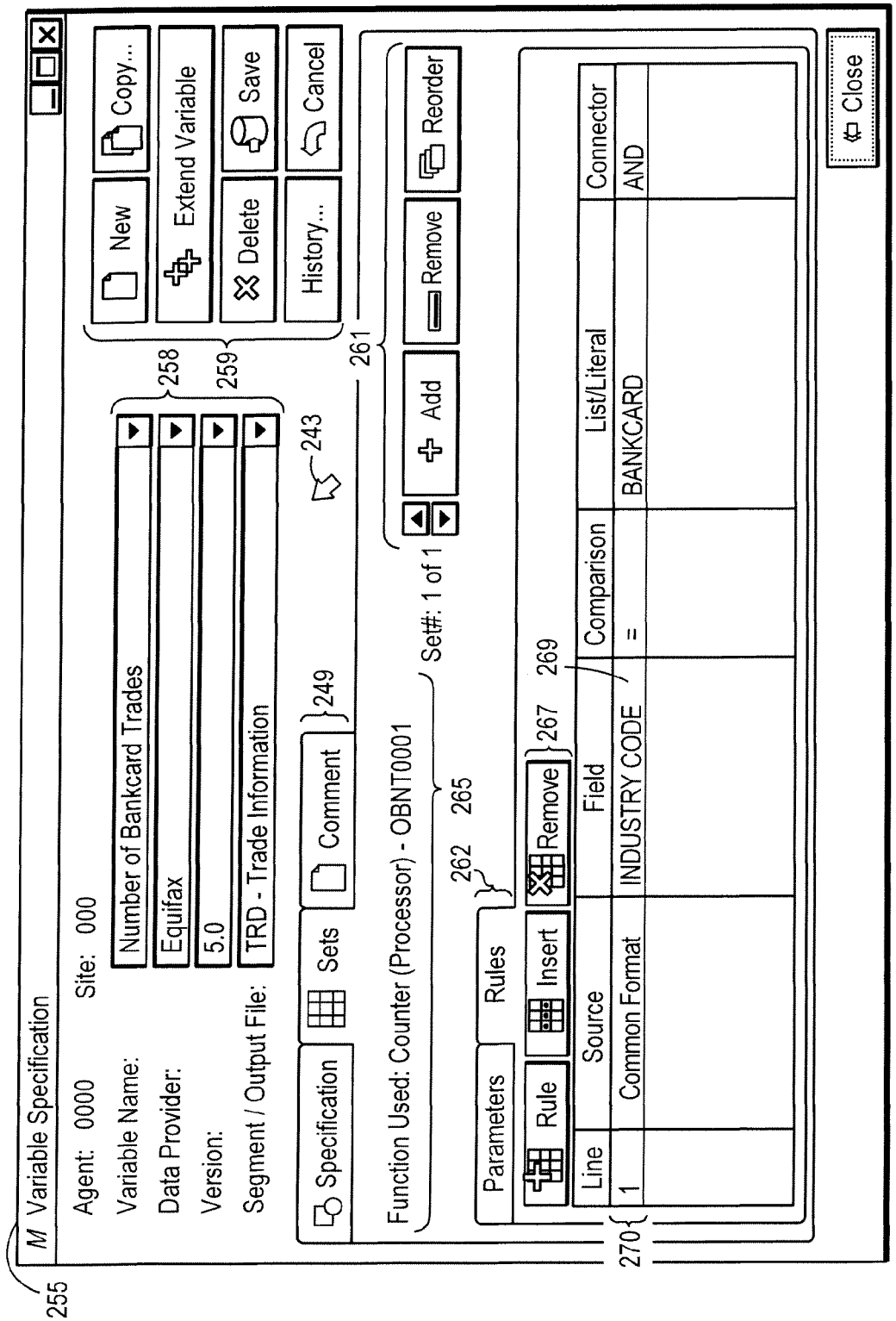

FIG. 3E is a view of a user interface 255 resulting from the user's selection of the 'Rules' tab 262 with a mouse or other input device. It also enables the user to specify the data associated with the attribute 256 that the user does not want to receive in order to avoid needless complexity in the result data 335 as well as avoiding receipt of data that may be prohibited or use-restricted under applicable law such as the FCRA. In this exemplary view, rule 269 is identified in the first and only line of list 270 which includes all rules related to the variable 258. The rule 269 includes data entries identifying the line number of the rule 269 in the list 270, the source of the rule 269 which indicates its format (e.g., 'Common Format'), a field identifying the code set with which the rule 269 is associated (e.g., 'INDUSTRY CODE'), a comparison field which indicates the logical operation related to the field code (e.g., '=' signifies a comparison of equality between the variable and the data sought, in this example, equality), the 'List/Literal' field (identified as 'BANKCARD' in FIG. 3E) signifies that the literal or operand list 252 name sought in the data is the one associated with the name 'BANKCARD'. The connector field identifies the logical operation to be performed with the rule following in the list 270. In the case of FIG. 3E there is no rule specified following the 'connector' field so that logical operation 'AND' is assigned to the field by default.

Figure 3F:
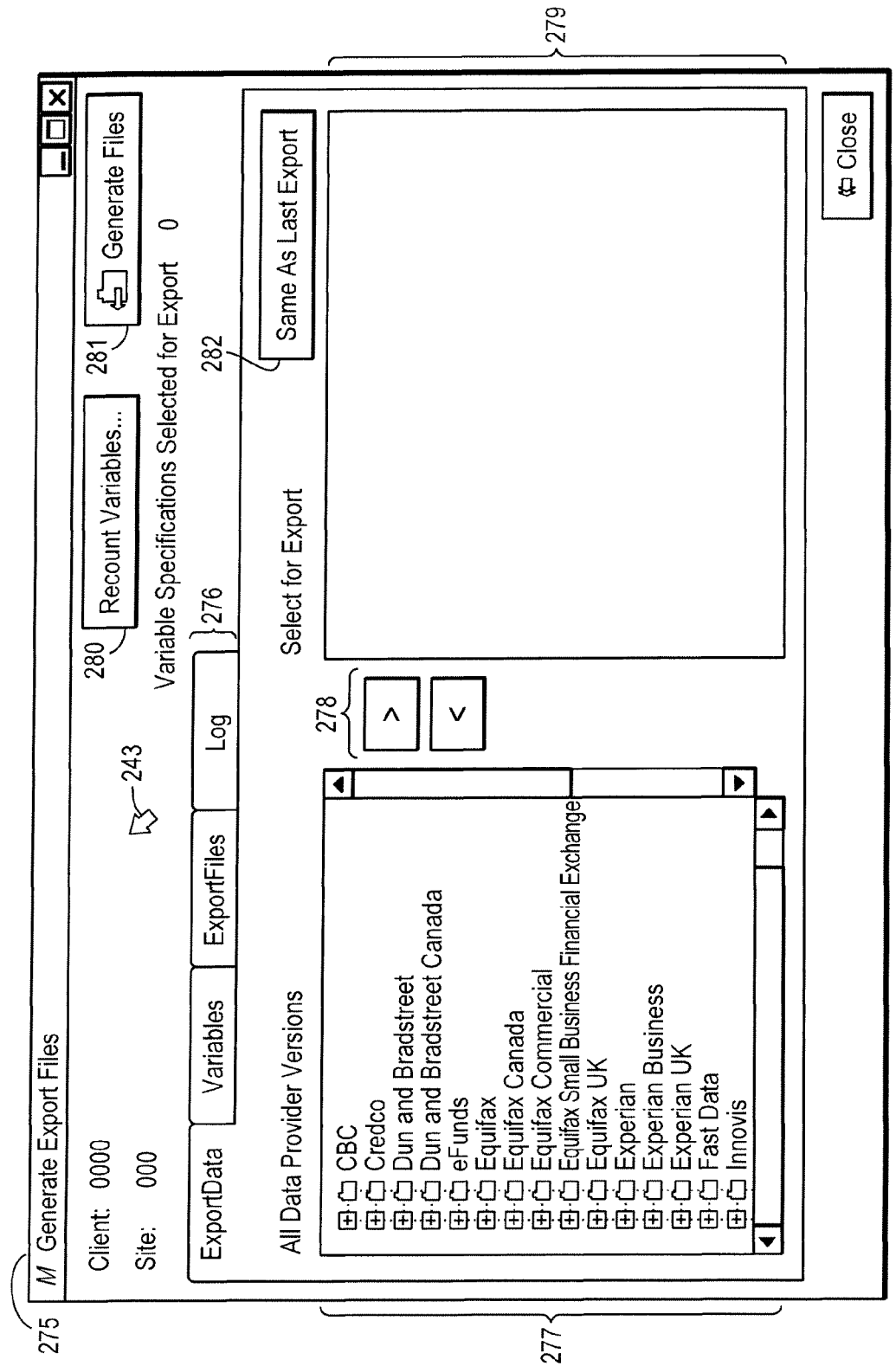

FIG. 3F is a view of a user interface 275 generated by design module 200 executed by computer 201. The user interface 275 is used to define files 205, to be exported from the client 500 to a data provider 600 for execution on its execution engine 300. In FIG. 3F the 'ExportData' tab 276 is shown and it identifies a list of data providers 600 to which the files can be exported. By selecting one or more of the data providers in list 277 and pressing the '>' button 278, a file can be selected and added to the list 279 of files for export. Conversely, by selecting a file from the list 278 (no files are present in list 278 in the example of FIG. 3F), and operating the '<' button 278, a file can be deleted from the list 278 so that it is not exported to a data provider 600, but is added to the list 277. Control 280 will be explained with reference to FIG. 3G. Control 281 can be used to generate files 281 into a format suitable for export. Control 282 enables the user to specify the same files as the previous export operation for export in the current export operation.

Figure 3G:

FIG. 3G is a view of the user interface 275 generated by design module 200 on computer 201. The user interface 275 shows the presentation resulting from the user's selection of the 'Variables' tab 276. The user interface 275 shows a list 283 of variable names in association with 'Audit' and 'Export' checkbox options. The Audit option enables the user to select from the list 283 of variables 256 those for which the user desires to record all data and actions executed to calculate the attribute result. The Audit option is useful for testing use of the design module 200 and/or export module 300 by providing the data used to generate a variable to ensure that the design module and export module are working as the user intended. It may also be helpful to a user to be able to determine the meaning attached to the data by the data provider so that data from different providers can be used despite different semantic meanings attached to the data. The Export option enables the user to select from the list 283 the variables to be exported to the data provider 600 for computation by the export module 300 at the data provider's location. Controls 284 provide various conveniences to the user, including a 'Select All' control to enable the user to select all variables 256 in the list 283 for audit, a 'Select None' control to enable the user to select none of the variables 256 in the list 283 for audit, and a 'Same As Last Export' control to enable the user to repeat the variables 256 selected for audit from the list 283. Similarly, export controls 285 provide the user with the ability to 'Select All' variables 256 in the list 283 for export to an export module 300 of a data provider 600 for computation, a 'Select None' control operable by the user to de-select variables 256 for export, and a 'Same as Last Export' control to enable the user to repeat the selection of variables 256 used in the previous export operation.

Figure 3H:
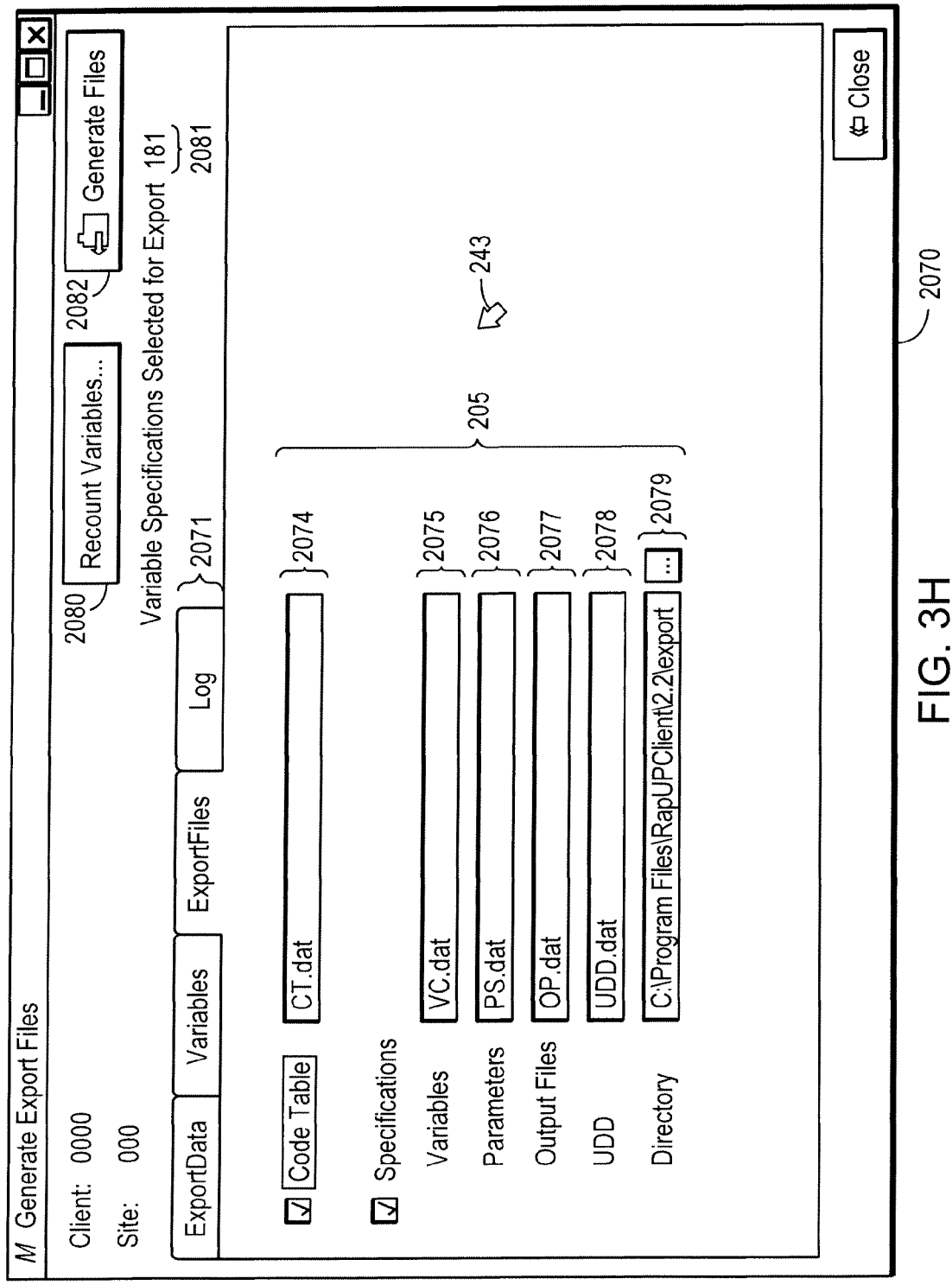

FIG. 3H is a view of 'Generate Export Files' user interface 2070 generated by the design module 200 of the computer 201. The user interface 2070 enables the user to specify those files 205 that are to be exported to the execution engine 300. The user interface 2070 is that resulting by selection of the 'Export Files' tab 2072. The user can activate check box 2072 to indicate that a 'Code Table' or code file(s) 2052 is to be exported. By entering the filename ('CT.dat'), in the field 2074, the user can specify the code file(s) 2052 to be exported. By activating the check box 2073, the user can indicate that specifications 205 are to be exported to the execution engine 300. By entering the filename ('VC.dat') of variable file(s) into field 2075, the user specifies the variable file to be exported. By entering the filename ('PS.dat') into the field 2076, the user specifies the parameter file to be exported. By entering the file name ('OP.dat') into the field 2077, the user specifies an output file to be exported to the execution engine 300. Finally, by entering the filename ('UDD.dat') into the field 2078, the user enters the display format 2004 the user desires for the result data 335. Using the Directory field 2079, the user can specify the path and filename for the directory to hold the specification files for export. Export can be implemented by design module 200 or some other component of the client's system, either automatically (e.g., via server application using HTTP protocol) or with manual intervention (e.g., email). The user interface 2070 of FIG. 3H also includes a 'recount variables' control 2080 that can be used by the user to count the variables in the export file as a check to ensure that the correct number of variables are in the export file as a check for any editing of variables carried out by the user. Finally, the 'Generate Files' control 2082 actually creates the file(s) to be stored at the directory location specified in field 2079. The computer 201 can be configured to automatically export the files from the directory location specified in field 2079, optionally with the user's involvement (e.g., emailing the directory to the data provider 600 for import to the execution engine 300). Although not shown, the decision rules can be output to the directory for export to the execution engine 300 using an interface similar to the user interface 2070 of FIG. 3H.

The 'Output File Mapping' user interface 290 of FIG. 3I is generated by the design module 200 executed with the computer 201. The user interface 290 is used for creating the record structure of the result file 335 that will contain the attribute results generated by the export module 300. The user interface 290 includes fields 291 for identifying the client and site to which the file mapping is relevant, as well as a selectable field to enable the user to select a file name from among a list of possible files (in FIG. 3I the file 'CBSUM' is selected using the pop down menu). Fields 292 specify the variables 256 to be mapped to result data 335. Field 293 indicates the permissible values (in this example, 'Y' or 'N') which the selected variable in the list 292 can have. Fields 294 provide a quick means of locating a variable that has already been mapped using the pop-down menu to select the column of data to search such as Variable Name, or Result Field, then entering the corresponding value to refine the search. The list 295 contains the attribute result and further describes the result type followed by the data type and relative position of the data within the result file 335. The user can select from among these variables 256 shown in list 292 to add to the list 295. Alternatively, by selecting a variable 256 in the list 295 and selecting the remove control 296, a user can delete a variable 256 from the listing 295. Controls 297 enable a user to create a new output file mapping with a 'New' Control, to delete an existing output file mapping with 'Delete' control, or to edit an existing output file mapping with the 'Edit' control.

Figure 3J:
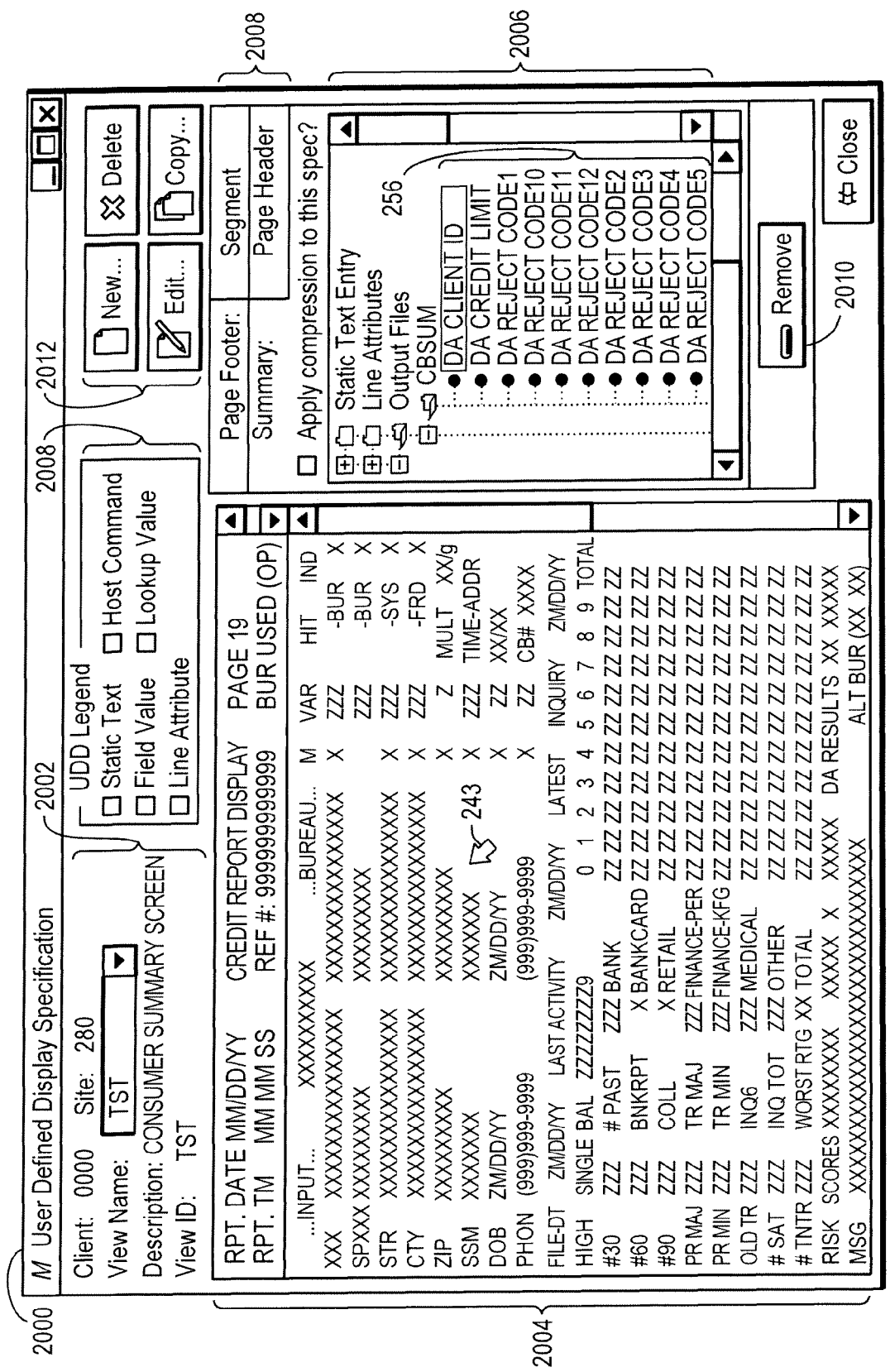

FIG. 3J is a view of a 'User Defined Display Specification' user interface 2000 generated by the design module 200 of the computer 201. The user interface 2000 can be operated by a user to format of display of variables 256 and data 307. Fields 2002 identify the client and site name (the client is indicated as '0000' and site is indicated as '280' in FIG. 3J), the view name ('TST' in FIG. 3J) for display 2004, and a description of the screen contents or purpose (indicated as 'CONSUMER SUMMARY SCREEN' in FIG. 3J), and a field identifying the screen 2004 being displayed ('ViewID: TST' in FIG. 3J). Using the cursor 243 the user can configure the screen 2004. The user can move the cursor 243 to a selected location of the screen 2004 using a mouse, for example. The user can then use the keyboard of computer 201 in order to enter characters to define static text to be displayed in the screen 2004. For example, in FIG. 3J the user can enter the static identifiers 'CREDIT REPORT DISPLAY' to identify the display 2004 in a manner that can be readily understood by the user, the static data 'RPT DATE' indicates the date of the credit report, etc. The values for the fields are derived by using the cursor 243 to select one of the variables from file listing 2006 and 'dragging' and 'dropping' the variable to the corresponding field of the screen display 2004. Because the field size and data type (for instance, numeric, alphabetic or alphanumeric) has been previously defined for the variable (see e.g. FIG. 3H), the design module 200 automatically generates a field of appropriate size to incorporate into the screen display 2004 at the position indicated by the user. Furthermore, the design module 200 indicates the field position in the display 2004 in a color scheme identified by legend 2008 so that the user can readily comprehend the type of data that is to be displayed in the corresponding field upon generation of the display 2004 (for example, 'XXXXXXXXX' displayed in a particular color can be used to indicate that the corresponding field has a value derived from a defined variable). The list 2006 shown in FIG. 3J is that which results upon selecting the 'Summary' tab of the tabs 2008. Other tabs 2008 include the 'Page Header' tab to define the layout of the page header, the 'Page Footer' tab to define the layout of the page footer, and the 'Segment' tag to define the detailed data 307. The user also has the option of selecting the 'Remove' button 2010 to delete a "tabs worth" of specifications. In addition, the user can operate the design module 200 using cursor 243 to activate the controls 2012. The 'New' control 2012 can be used to create a new screen 2004, the 'Delete' control 2012 can be used to delete a screen 2004, the 'Edit' control can be used to edit an existing screen 2004 and the 'Copy' control can be used to copy a screen 2004, for example, as the basis for a new screen display to avoid duplication of effort in preparing the screen layout.

FIG. 3K is a view of a 'Decision Assistant' user interface 2020 generated by the design module 200 of the computer 201. The user interface 2020 is designed to enable the user to create decision rules 210 used to generate result data files 335 from the data provider's data 307. The decision rules 210 developed with the Decision Assistant are defined in a language which is intuitive to the user. For example, under the heading 'MAIN BUSINESS EVALUATION CARD' the following rule structure is provided:

---

MAIN BUSINESS EVALUATION CARD
001 Group 1
   001 if CSV-BANKRUPTCY=Y then STATUS = Q, REASON = 10 x or

---

Thus, user interface 2020 provides that for Group 1 of a hierarchical tree of logic defining decision rules 210, that if for line 001 of the code the variable 'CSV-BANKRUPTCY' is 'Y' (meaning 'YES') then the 'STATUS' variable is equal to code 'Q' and the 'REASON' variable is equal to code '10x'. If not, then control proceeds to the logic defined for Group 2 of the decision rules, and so forth. A user thus has the ability to define the logic required for the decision rules 210 without having to be a programmer skilled in a particular computer language to do so.

Figure 3L:
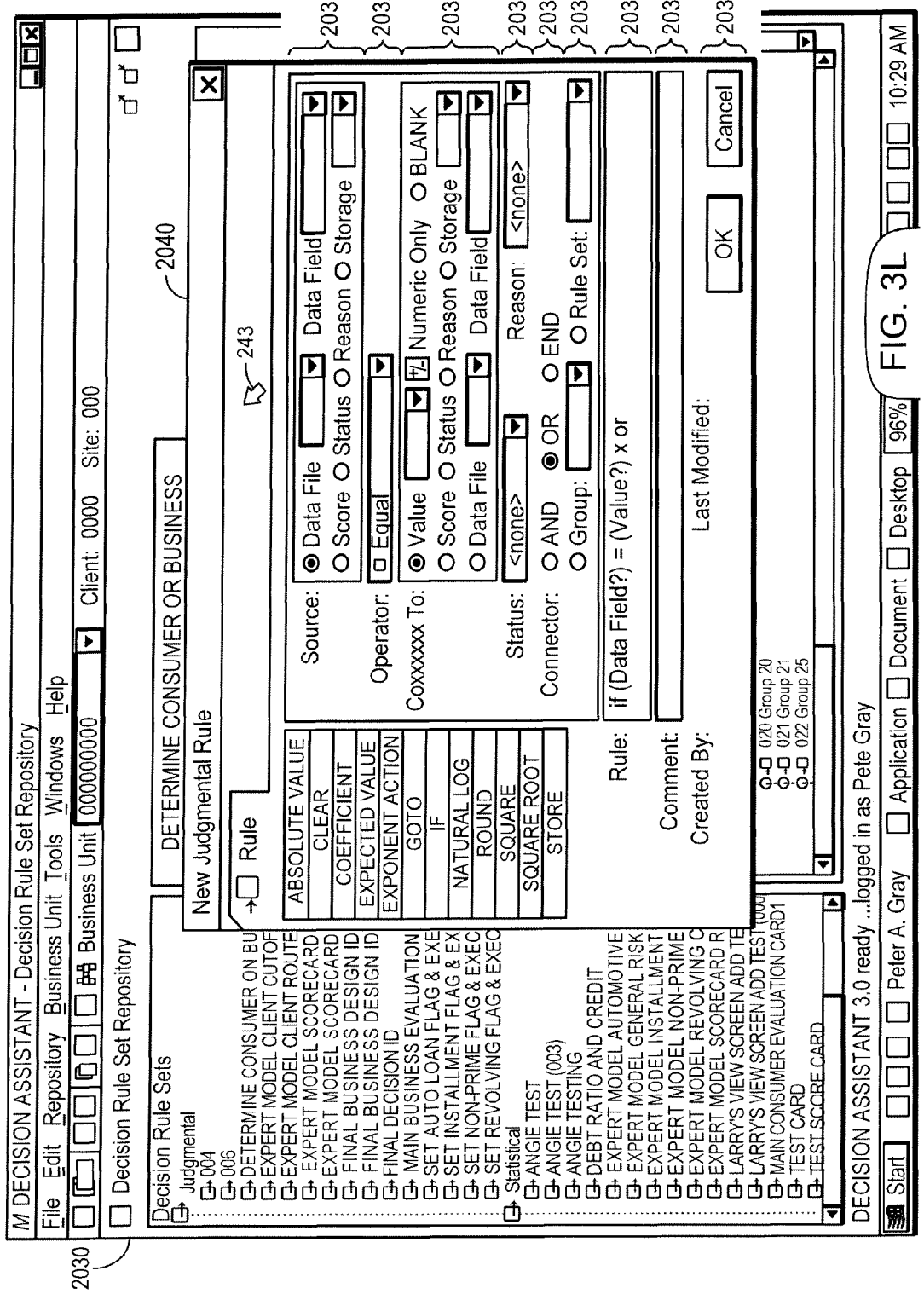

FIG. 3L is a view of a 'Decision Rule' defining user interface 2030 generated by the design module 200 of the computer 201. The user interface 2030 is designed to enable the user to create the decision rules 210, such as the lines of logic shown in FIG. 3K. The user interface 2030 includes a source field 2031 which enables the user to define the source file "Data File" for the first operand to which the decision rules 210 being developed are to be applied. The source field 2031 also has a 'Data Field' that enables the user to select the variable name associated with the data for the first operand to which the user desires to apply the rule. The 'Score', 'Status', and 'Reason' fields designate the output variables for the results of applying the decision rules 210 to the data. The 'Storage' field enables the user to define where in memory the result is to be stored. The operator field 2032 allows the user to define the logical operator or function to be used to operate on the first and second operands defined in fields 2031 and 2033, respectively. Using a pop-down menu, the user can select various mathematical or logical operations such as 'equal', 'less than', 'greater than', etc. In addition, the user has the option of selecting the second operand from fields 2033. Using the fields 2033 and the computer's input/output devices, the user can enter a 'value' for the second operand, indicate whether that operand is numeric or alphanumeric, or leave the field blank (thus, assign a '0' value to the second operand). In addition, the user can use field 2033 to indicate whether the second operand is a 'Score', 'Status', or 'Reason' variable, and also a 'Storage' field to indicate where in memory the second operand is stored in order to locate it for comparison. The fields 2034 can be used by the user to select the 'Status' and 'Reason' codes to be associated with the result of the operation on the first and second operands. The field 2035 is used to define the relationship of the decision rule 210 defined with window 2040 to the decision rule following in the logical hierarchy (see, e.g., in FIG. 3K how the last 'or' operation of line 001 of Group 1 logically links the Group 1 rules to the Group 2 rules following). The 'Group' field 236 can be used to define the Group of rules to which the decision rule is to be routed, and the 'Rule Set' field 2036 is used to specify the rule set to which the defined rule is routed if the rule evaluates to be true. The field 2037 indicates the logical statement of the rule as it will appear in a line of the hierarchical tree of the decision rules 210. Field 2038 is a comment field enabling a user to type in a comment, e.g., a statement of the purpose of the rule as a guide to future editing and debugging). Finally, with respect to FIG. 3L, the controls 2039 enable the user to save the rule 210 by activated the 'Ok' button, or to reject the rule and exit window 2040 without saving the rule 210.

FIG. 3M is a user interface 2050 generated by the design module 200 of the computer 201. The design module 200 includes a listing of a code file 2052. The listing 2052 is selected using the menu in field 2054, i.e., the particular listing is a 'Reason' code file. The listing 2052 relates the codes 2056 (01, 02, 03, etc.) to corresponding reasons 2058 ('INSUFFICIENT LENGTH OF CREDIT HISTORY', '*Code added during import*', 'RECENT DELINQUENCY', etc.). The use of codes 2056 makes it possible to reference textual reasons in a shorthand way. These codes are used to identify the specifics of decision made. For example, if an applicant was denied credit, the reason, "INSUFFICIENT LENGTH OF CREDIT HISTORY" could be communicated to the consumer.

FIG. 3N is an 'Export' user interface 2060 generated by the design module 200 of the computer 201. The user interface 2060 enables a user to select decision rule sets 210 for export to the execution engine 300 to be applied against data 205 identified by the specification file 205. More specifically, the user operates the input device to move cursor 243 to check boxes 2064 to select corresponding rules sets 210 for export to the execution engine 300. Field 2065 enables the user to specify the location in memory (e.g., directory path and filename) for the file containing selected rule set(s) 210. The controls 2066 enable the user to select all or de-select all files for export. The control 2067 enables a user to view a selected rule set 210. The 'Start' control 2068 enables the user to transmit selected rule sets 210 to the export file location in memory for export to the execution engine 300. Export to the execution engine 300 can be performed automatically upon operation of the 'Start' control 2068, or it may be performed with the involvement of the user, e.g., by emailing the files from the export file location to the data provider 600 for import into the execution engine 300. The check box 2069 enables the user to indicate whether the rule set changed since the last export, making it necessary for at least the changed portions of the file to be exported to the execution engine 300.

Figure 3O:
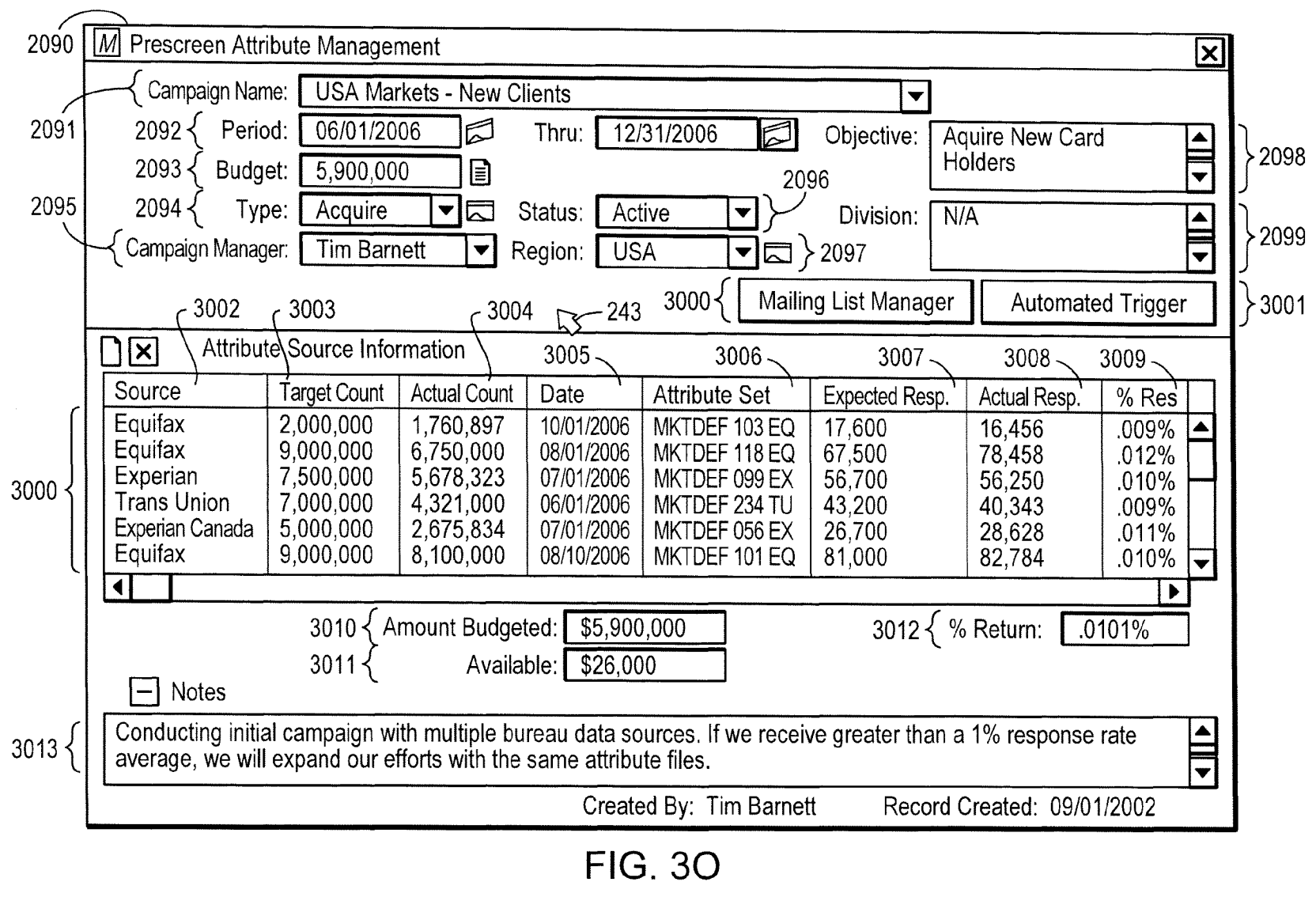

FIG. 3O is a view of a 'Prescreen Attribute Management' user interface 2090 which enables a user to evaluate the effectiveness of the attributes selected for use in a marketing campaign through results 335 they generate when processed by the execution engine 300. User interface 2090 is generated by the performance management module 400 executed by computer 401. The campaign name field 2091 identifies the marketing campaign to which the attributes relate. The marketing campaign could be a solicitation for credit card applications, loan applications, etc. or other product or service to be offered. The period field 2092 identifies the time period or dates over which the campaign is conducted. The budget field 2093 indicates the budget for the marketing campaign ('$5,900,000'). The type field indicates the type of marketing campaign to be conducted. In this case, the type field ('acquire') indicates the purpose of the marketing campaign is to acquire applications for credit cards. The status field 2096 indicates whether the campaign is active, suspended, inactive, etc. The field 2095 indicates the person responsible for the campaign. The region field 2096 indicates the geographic region in which the campaign is being conducted. The objective field 2098 indicates the purpose of the marketing campaign. In this case, the object is to 'acquire new card holders.' The division field 2099 indicates the division of the business that is conducting the marketing campaign.

Still referring to FIG. 3O the performance listing 3015 identifies the source 3002 (i.e., the data provider 300 that provided the data [e.g., Equifax, Experian, Trans Union, etc.]), the target count 3003 of credit card applications sought in the campaign, the actual count 3004 of credit card applications received in the campaign, the status date 3005 for which the data in the line item of the listing 3015 is relevant, the attribute set 3006 used in the marketing campaign to identify potential applicants to whom applications were sent in the campaign, the expected response 3007 based on past experience with similar applications and/or potential applicants, the expected response 3007 indicating the expected number of applicants to respond with credit card applications, the actual response 3008 indicating the actual number of applicants responding with credit card applications, and the percentage response 3009 which is a percentage derived by dividing the number of actual applicants by the number of solicitations sent to potential applicants, multiplied by one-hundred. The field 3010 indicates the monetary amount allocated by the business to the campaign, and field 3011 indicates the portion of the amount allocated that remains available to be spent. The field 3012 indicates the percentage return of applications averaged for solicitations provided for all data providers. Finally, the notes field 3013 indicates any comments the user desires to make regarding the campaign.

Those of ordinary skill in the art will appreciate that the wealth of information provided by the user interface 2090 provides the capability to effectively manage a marketing campaign using the performance management module 400. It can be used to identify attribute sets that are most likely to generate a desired pool of applicants or customers that a business desires for a marketing campaign. This enables the business to spend funds allocated for marketing campaigns in a manner most beneficial for the business. In addition, by varying the attribute sets used in marketing campaigns, the business can adjust marketing campaigns (eg, the pool of prospective applicants to which solicitations are sent, the criteria used for acceptance of applicants, etc.) to obtain the desired results from the campaign. In addition, through the use of identifiers common to related sets of attribute files, decision rule files, result data, and performance data, the user can gauge the performance of attributes and decision rules in generating the customers the client desires. In addition, because the FCRA and other laws require the attributes and decision rules to be applied consistently in solicitations and acceptance of applicants as customers, the present invention enables the user to comply with applicable law.

Although the invention described herein has been applied to specific embodiments related primarily to credit risk analysis, it should be understood that the subject invention can be applied to other fields. Such fields include use of restricted data to perform checks for prospective or current employees or others, including criminal, security, visa, immigration, driving record or financial status checks. Other fields to which the invention can be applied include use of restricted data to authenticate a person's identity, to detect and prevent fraud in financial transactions, to conduct security checks or clearances on employees, agents or others, to determine marketing credit or financial status or rating of a company or individual, to conduct demographic marketing, or to assess, analyze or underwrite medical or insurance risks. Virtually any field in which access to data is regulated by law or federal agency can benefit from use of the subject invention, including the fields of consumer protection or national security. In general, any field that requires processing of data to which access is restricted by law, regulation, business practice, ethical considerations (for example, legal or medical confidences) or for other reason that is used to generate a result provided outside of the zone of restriction in which the data resides (for example, an organization hosting the restricted data) can benefit from the claimed invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

All trademarks or service marks referenced herein are the property of their respective owners. Reference to the marks is for the purpose of identifying the source of particular products or services. In the case of marks other than those of the assignee, reference to the marks is not intended in any way to trade upon the good will those owners have established in those marks, or to make other than fair use thereof.

The invention claimed is:

1. A client computer system comprising one or more client computing device, the client computer system configured:
   receive result data transmitted from a data provider computer system at a data provider's site, wherein
      (a) the result data is generated by the data provider computer system by applying a set of one or more attributes and one or more decision rules to the data provider's data to identify a plurality of credit records corresponding respectively to a plurality of consumer credit profiles from the data provider's data that satisfy the set of one or more attributes and one or more decision rules,
      (b) the set of one or more attributes and one or more decision rules are defined by a user via a client computing device associated with the client computer system, and
      (c) the result data comprises at least a portion of each credit record of the plurality of credit records from the data provider's data that satisfy the set of one or more attributes and one or more decision rules, and
   obtain contact information for at least a portion of the consumers associated with the result data, wherein the contact information is used to provide a solicitation to the at least a portion of the consumers associated with the result data.

2. A client computer system as claimed in claim 1 wherein the client computer system transmits the set of one or more attributes and one or more decision rules to the data provider computer system via a communication network.

3. A client computer system as claimed in claim 2 wherein the communication network is the Internet.

4. A client computer system as claimed in claim 1 further configured to store the result data in association with data identifying the set of one or more attributes and one or more decision rules.

5. A client computer system as claimed in claim 1 wherein the solicitation comprises an application for a benefit or offering of a marketing campaign.

6. A client computer system as claimed in claim 5 further configured to:
   receive performance data associated with the marketing campaign, wherein the performance data is selected from the group consisting of (a) a number of applications returned by consumers, (b) a number of applications accepted by the entity for the benefit or offering, (c) a payment performance of the consumers under the benefit or offering, and (d) a profitability of the benefit or offering; and
   cause display of information indicating the performance of the marketing campaign based on the performance data.

7. A client computer system as claimed in claim 5 wherein the benefit or offering is use of a credit card.

8. A client computer system as claimed in claim 5 wherein the benefit or offering is a loan for purchase of real estate, a vehicle, aircraft, watercraft, an electronic consumer device, or a consumer appliance.

9. A client computer system as claimed in claim 1 further configured to:
   modify the set of one or more attributes and one or more decision rules based at least in part on the result data; and
   transmit the modified set of one or more attributes and one or more decision rules to the data provider computer system for use by the data provider computer system in generating result data.

10. A client computer system as claimed in claim 1 wherein the result data does not include credit data that would fall under Fair Credit Reporting Act (FCRA) regulations.

11. A client computer system as claimed in claim 1 wherein the data provider computer system carries out a batch of transactions to produce the result data.

12. A method comprising:
   receiving, via a client computer system, result data transmitted from a data provider computer system at a data provider's site, wherein
      (a) the result data is generated by the data provider computer system by applying a set of one or more attributes and one or more decision rules to the data provider's data to identify a plurality of credit records corresponding respectively to a plurality of consumer credit profiles from the data provider's data that satisfy the set of one or more attributes and one or more decision rules,
      (b) the set of one or more attributes and one or more decision rules are defined by a user via a client computing device, and
      (c) the result data comprises at least a portion of each credit record of the plurality of credit records from the data provider's data that satisfy the set of one or more attributes and one or more decision rules, and
   obtaining, via the client computer system, contact information for at least a portion of the consumers associated with the result data, wherein the contact information is used to provide a solicitation to the at least a portion of the consumers associated with the result data.

13. A method as claimed in claim 12 further comprising transmitting the set of one or more attributes and one or more decision rules to the data provider computer system via a communication network.

14. A method as claimed in claim 13 wherein the communication network is the Internet.

15. A method as claimed in claim 12 further comprising storing the result data in association with data identifying the set of one or more attributes and one or more decision rules.

16. A method as claimed in claim 12 wherein the solicitation comprises an application for a benefit or offering of a marketing campaign.

17. A method as claimed in claim 16 wherein the benefit or offering is use of a credit card.

18. A method as claimed in claim 16 wherein the benefit or offering is a loan for purchase of real estate, a vehicle, aircraft, watercraft, an electronic consumer device, or a consumer appliance.

19. A method as claimed in claim 16 further comprising:
   receiving performance data associated with the marketing campaign, wherein the performance data is selected from the group consisting of (a) a number of applications returned by consumers, (b) a number of applications accepted by the entity for the benefit or offering, (c) a payment performance of the consumers under the benefit or offering, and (d) a profitability of the benefit or offering; and
   causing display of information indicating the performance of the marketing campaign based on the performance data.

20. A method as claimed in claim 12 further comprising:
   modifying the set of one or more attributes and one or more decision rules based at least in part on the result data; and
   transmitting the modified set of one or more attributes and one or more decision rules to the data provider computer system for use by the data provider computer system in generating result data.

21. A method as claimed in claim 12 wherein the result data does not include credit data that would fall under Fair Credit Reporting Act (FCRA) regulations.

22. A method as claimed in claim 12 wherein the data provider computer system carries out a batch of transactions to produce the result data.

* * * * *